United States Patent
Olsson et al.

(10) Patent No.: US 9,435,907 B2
(45) Date of Patent: Sep. 6, 2016

(54) PHASE SYNCHRONIZED BURIED OBJECT LOCATOR APPARATUS, SYSTEMS, AND METHODS

(75) Inventors: Mark S. Olsson, La Jolla, CA (US);
Ray Merewether, La Jolla, CA (US);
David A. Cox, San Diego, CA (US);
Jan Soukup, San Diego, CA (US);
Timothy M. Turner, El Cajon, CA (US)

(73) Assignee: SEESCAN, INC., San Diego, CA (US)

( * ) Notice: Subject to any disclaimer, the term of this patent is extended or adjusted under 35 U.S.C. 154(b) by 742 days.

(21) Appl. No.: 13/570,211

(22) Filed: Aug. 8, 2012

(65) Prior Publication Data
US 2013/0200901 A1 Aug. 8, 2013

Related U.S. Application Data

(60) Provisional application No. 61/521,362, filed on Aug. 8, 2011, provisional application No. 61/561,809, filed on Nov. 18, 2011.

(51) Int. Cl.
| | |
|---|---|
| *G01V 3/08* | (2006.01) |
| *G01V 3/00* | (2006.01) |
| *G01V 3/12* | (2006.01) |
| *G01V 3/10* | (2006.01) |
| *G01V 3/165* | (2006.01) |
| *G01V 3/04* | (2006.01) |
| *G01V 3/06* | (2006.01) |

(52) U.S. Cl.
CPC ............... *G01V 3/12* (2013.01); *G01V 3/081* (2013.01); *G01V 3/104* (2013.01); *G01V 3/165* (2013.01); *G01V 3/04* (2013.01); *G01V 3/06* (2013.01)

(58) Field of Classification Search
CPC ......... G01V 3/12; G01V 3/081; G01V 3/104
USPC .................................................. 324/326–329
See application file for complete search history.

(56) References Cited

U.S. PATENT DOCUMENTS

| | | | |
|---|---|---|---|
| 4,994,747 A | 2/1991 | Stolarczyk | |
| 5,194,812 A | 3/1993 | Yokoi | |
| 5,629,626 A * | 5/1997 | Russell et al. | 324/345 |
| 5,640,092 A * | 6/1997 | Motazed et al. | 324/326 |
| 6,140,819 A * | 10/2000 | Peterman et al. | 324/326 |
| 7,443,154 B1 | 10/2008 | Merewether | |
| 7,675,289 B1 * | 3/2010 | Stolarczyk et al. | 324/334 |
| 8,058,874 B2 * | 11/2011 | Royle et al. | 324/326 |
| 2005/0096879 A1 | 5/2005 | Waite | |
| 2005/0248333 A1 * | 11/2005 | Schlapp et al. | 324/67 |
| 2011/0112787 A1 * | 5/2011 | Daw et al. | 702/95 |
| 2011/0191058 A1 * | 8/2011 | Nielsen et al. | 702/130 |

FOREIGN PATENT DOCUMENTS

WO PCT/US2012/050039 R 2/2014

* cited by examiner

*Primary Examiner* — Bot Ledynh
(74) *Attorney, Agent, or Firm* — Steven C. Tietsworth, Esq

(57) ABSTRACT

Buried object locator systems including transmitters and associated buried object locators using phase-synchronized signals are disclosed. A transmitter may generate output current signals that are phase-synchronized such that an associated locator may receive magnetic field signals from the output current signal and determine information about the current flow based on independent phase-synchronization timing information.

22 Claims, 29 Drawing Sheets

Example System on Which Embodiments May be Implemented

Example System on Which Embodiments May be Implemented

Example Transmitter Output Coupling to Buried Object by Direct Connection

Example Transmitter Output Coupling to Buried Object by Inductive Connection

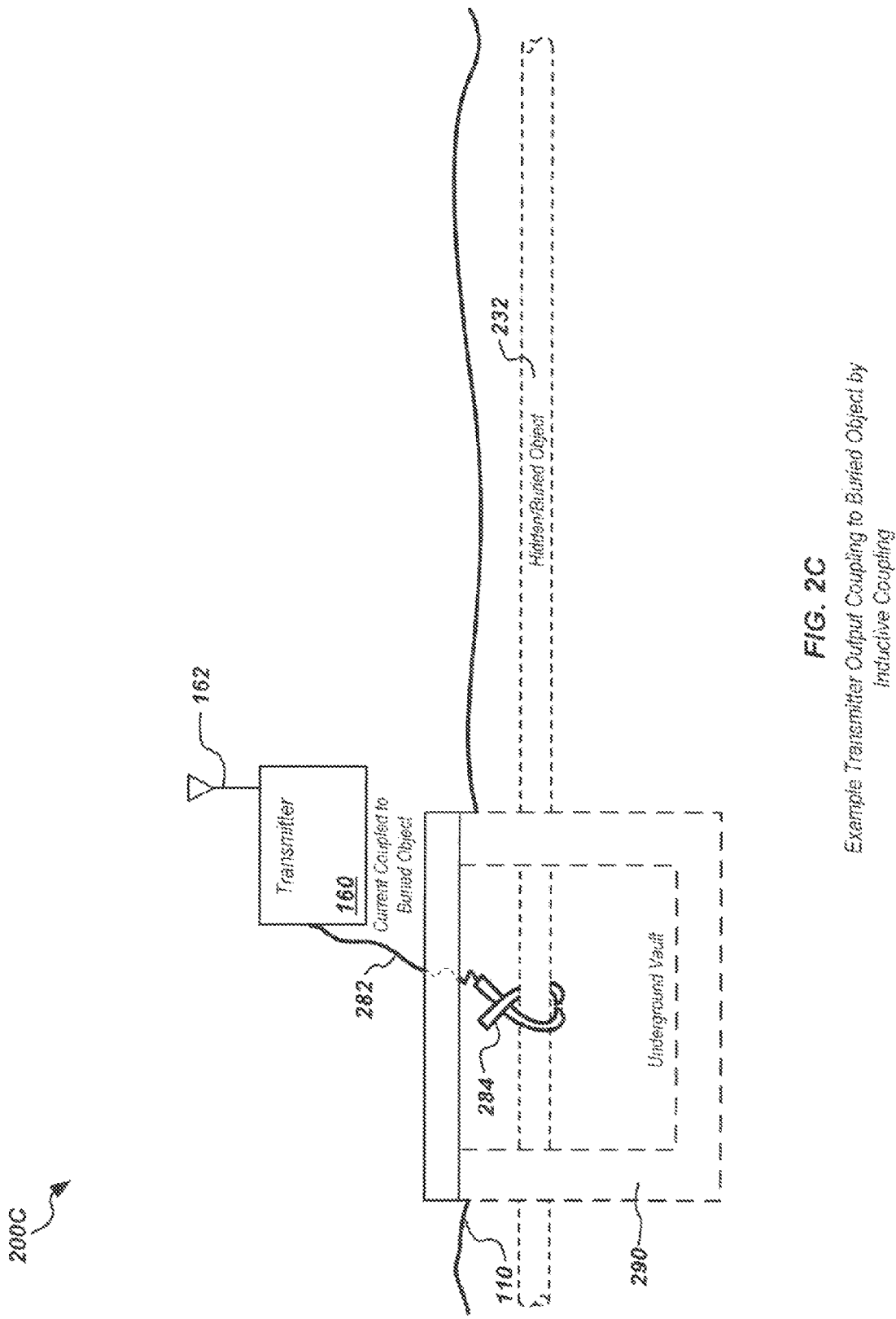

Example Current Signaling in Buried Object

Example Current Signaling in Buried Object with Approximately Zero Degrees Phase Shift

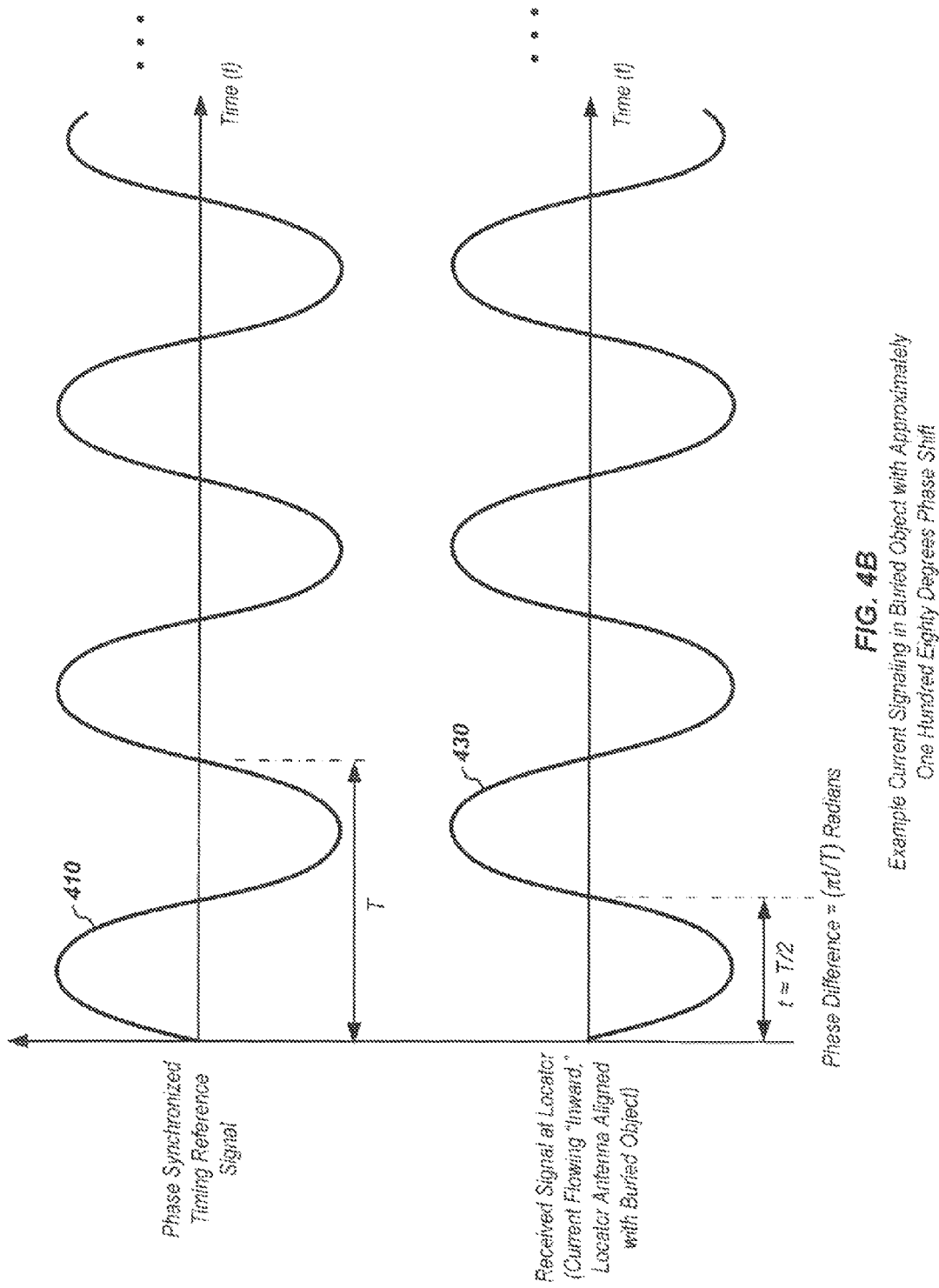

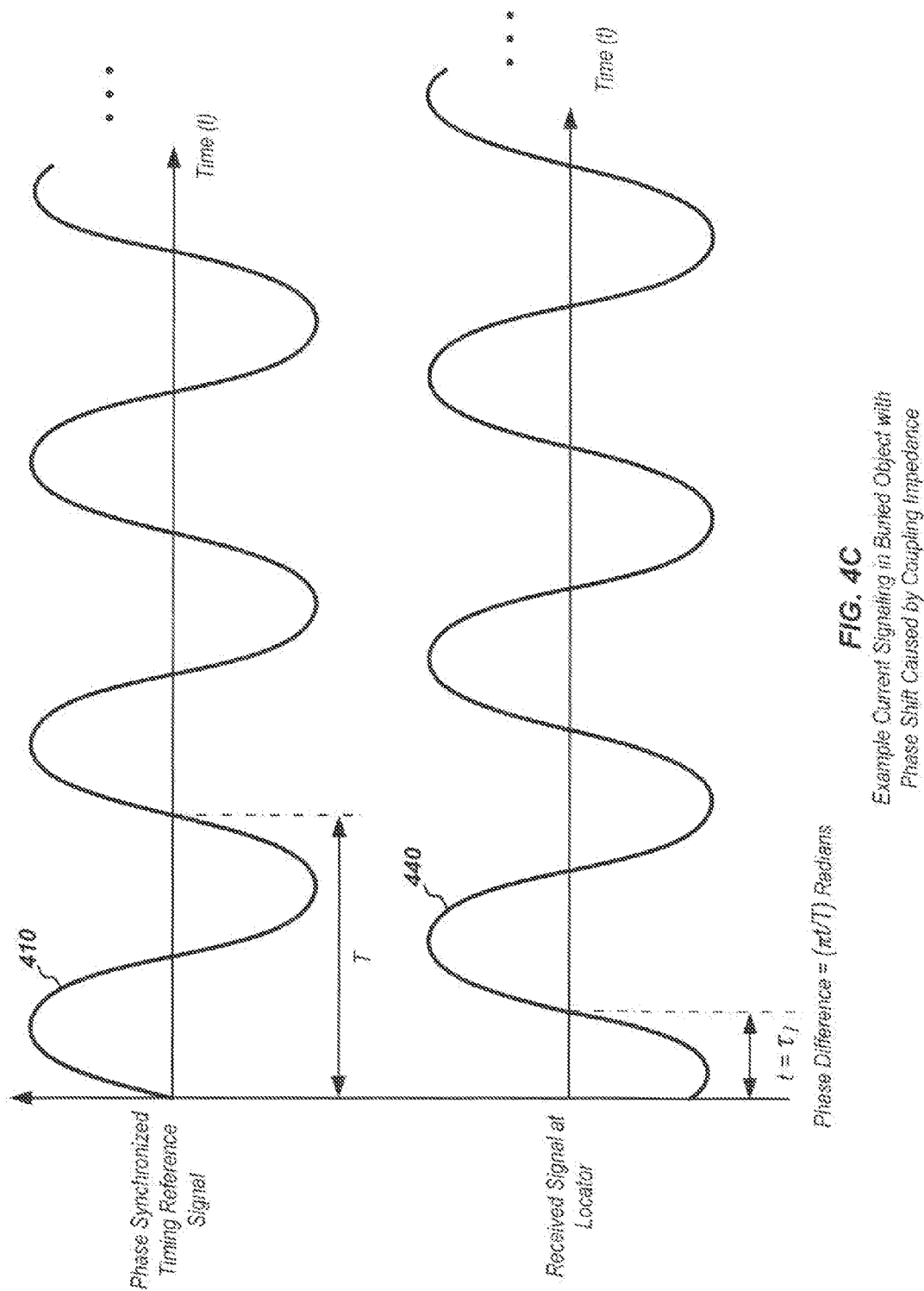

Example Current Signaling in Buried Object with Phase Shift Caused by an Angular Offset of a Locator Antenna to the Buried Object Example Circuit for Modeling Current Phase Shift

*Example Circuit for Measuring and Controlling Output Current Phase for Synchronization with Timing Reference*

Example Circuit for Measuring and Communicating Current Phase
Offset for Synchronization with Timing Reference Example Circuit for Receiving and Processing Received Locator Signal (from Current in Buried Object) along with Phase Offset Information Example Phase Locked Loop (PLL) Circuit for Generating Phase Synchronized Signal Example Process for Generating Phase
Synchronized Output Signals in a Transmitter Example Process for Generating Phase Synchronized Output Signals in a Transmitter

*Example Process for Receiving and Processing Phase Synchronized Output Signal from Buried Object Current*

Example Process for Receiving and Processing Phase Synchronized Output Signal from Buried Object Current, with Phase Offset Information Example Transmitter Configuration with Output Coupling Feedback Adjustment Example Transmitter Configuration with Transmission of Phase Offset Information Example Buried Object Locator Configuration Example Locator Configuration Example Process for Generating Locator Output Signals in a Transmitter at a Plurality of Frequencies Example Process for Generating Locator Output Signals in a Transmitter

*Example Process for Receiving and Processing Time Plurality of Time Synchronized Locator Output Signals to Determine Information About Current and/or Impedance*

Example Process for Receiving and Processing Time Plurality of Time Synchronized Locator Output Signals and Phase Offsets to Determine Information About Current and/or Impedance

PHASE SYNCHRONIZED BURIED OBJECT LOCATOR APPARATUS, SYSTEMS, AND METHODS

CROSS-REFERENCE TO RELATED APPLICATIONS

This disclosure claims priority under 35 U.S.C. §119(e) to U.S. Provisional Patent Application Ser. No. 61/521,362, entitled PHASE SYNCHRONIZED BURIED OBJECT LOCATOR APPARATUS, SYSTEMS, & METHODS, filed Aug. 8, 2011, and to U.S. Provisional Patent Application Ser. No. 61/561,809, filed Nov. 18, 2011. The content of each of these applications is hereby incorporated by reference herein in its entirety for all purposes.

FIELD

This disclosure relates generally to apparatus, systems, and methods for locating buried objects. More specifically, but not exclusively, the disclosure relates to buried object locators and associated transmitters for generating and sending current signals in buried or hidden objects.

SUMMARY

This disclosure relates generally to apparatus, systems, and methods for locating buried objects. More specifically, but not exclusively, the disclosure relates to buried object locators and associated transmitters for generating and sending current signals in buried or hidden objects.

In one aspect, the disclosure relates to a method for use in a buried object locator system transmitter. The method may include, for example, receiving a transmitted signal, including timing information, at the transmitter. The method may further include generating a timing reference from the timing information at the transmitter and generating a phase-synchronized output signal having a phase determined at least in part by the timing reference at the transmitter. The method may further include sending the output signal from the transmitter to a coupling apparatus.

In another aspect, the disclosure relates to a method for use in a buried utility locator system. The method may include, for example, receiving a magnetic field signal associated with a current in a buried object, wherein the magnetic field signal is generated with a phase based at least in part on a first timing reference determined from a first transmitted signal including first timing information. The method may further include receiving a second transmitted signal including second timing information and determining a second timing reference from the second timing information. The method may further include determining information related to the current in the buried object based on the received magnetic field signal and second timing reference.

In another aspect, the disclosure relates to a transmitter for use in a buried utility locator system. The transmitter may include, for example, a timing synchronization module including a timing receiver module configured to receive a first transmitted signal that includes timing information and a timing reference module to determine a timing reference from the timing information. The transmitter may further include an output signal generation module configured to generate a phase-synchronized current output signal having a phase determined at least in part by the timing reference.

In another aspect, the disclosure relates to a locator for use in a buried utility locator system. The locator may include, for example, a locator receiver module for receiving a magnetic field signal from a buried object associated with a current in the buried object, wherein the magnetic field signal is generated with a phase based at least in part on a first timing reference determined from a first transmitted signal including first timing information. The locator may further include a timing synchronization module including a receiver module configured to receive a second transmitted signal that includes second timing information and a processor module configured to determine a second timing reference from the second timing information. The locator may further include a processing module configured to determine information related to the current in the buried object based on the received magnetic field signal and the second timing reference.

In another aspect, the disclosure relates to methods for operating and using the above described methods and apparatus.

In another aspect, the disclosure relates to processor readable media including instructions for causing a processing element to implement the above-described methods, in whole or in part.

In another aspect, the disclosure relates to means for implementing the above-described methods and apparatus, in whole or in part.

Various additional aspects, features, and functions are further described below in conjunction with the appended Drawings.

BRIEF DESCRIPTION OF THE DRAWINGS

The present disclosure may be more fully appreciated in connection with the following detailed description taken in conjunction with the accompanying drawings, wherein:

FIG. 2C illustrates details of another embodiment of a buried object transmitter and associated coupling of an output current to a buried object;

FIG. 4B illustrates details of example signals in an embodiment of a buried object locator that may be processed to determine an "inward" direction of current flow in a buried object;

FIG. 4C illustrates details of example signals in an embodiment of a buried object locator that illustrate a phase offset in a transmitter output due to coupling impedance to a buried object;

DETAILED DESCRIPTION OF EMBODIMENTS

Figure 1:
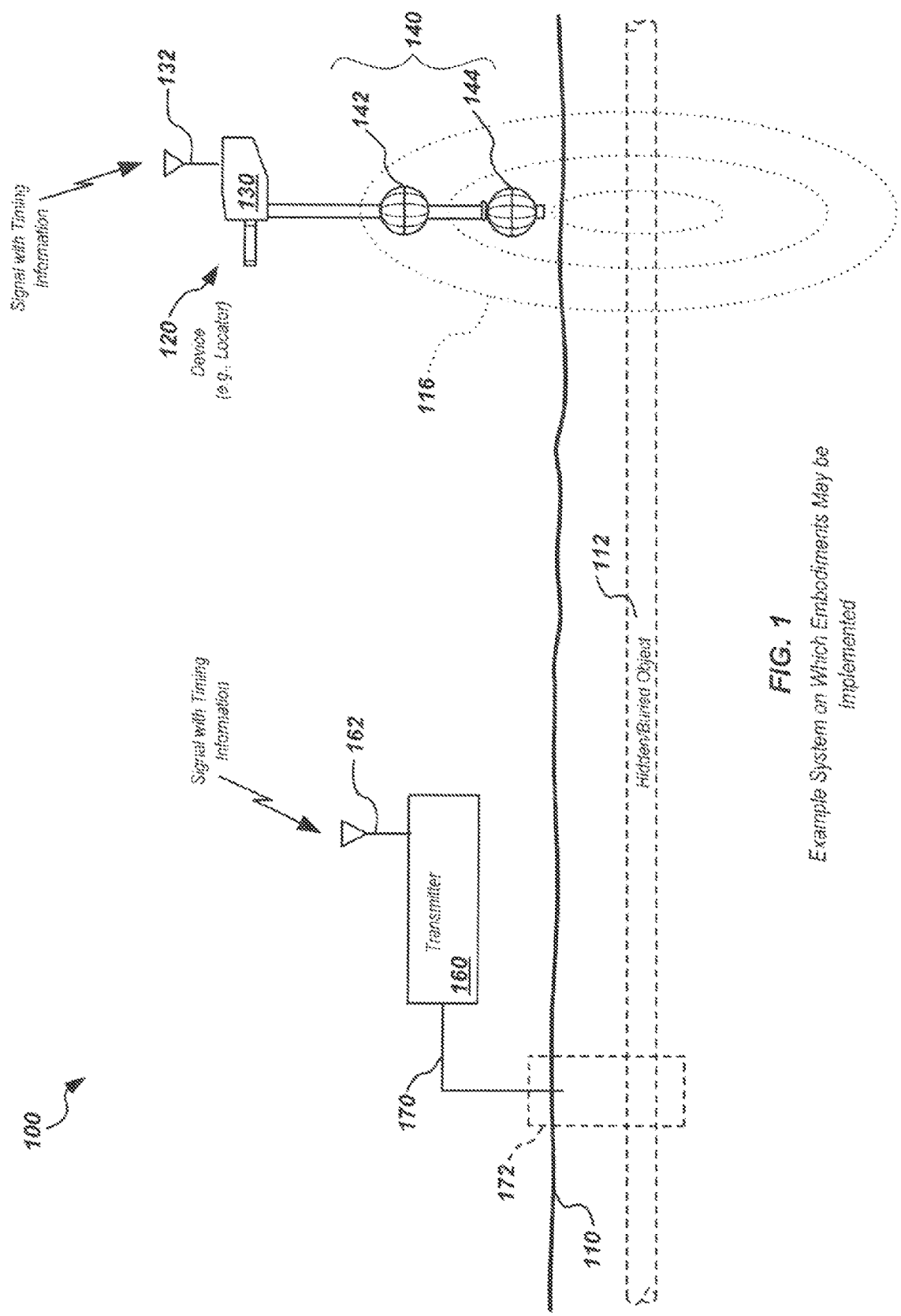
FIG. 1 illustrates details of a buried object locator system on which embodiments may be implemented.

This disclosure relates generally to apparatus, systems, and methods for locating buried objects. More specifically, but not exclusively, the disclosure relates to buried object locators and associated transmitters for generating and sending current signals in buried or hidden objects.

For example, in one aspect, the disclosure relates to a method for use in a trans-mitter device, such as in a buried object locator system transmitter. The method may include, for example, receiving a transmitted signal, including timing information, at the transmitter, generating a timing reference from the timing information at the transmitter, generating a phase-synchronized output signal having a phase determined at least in part by the timing reference at the transmitter, and sending the output signal from the transmitter to a coupling device.

The transmitted signal may be, for example, a satellite-based transmission. The satellite-based transmission may be a Global Positioning Satellite (GPS) system signal. The satellite-based transmission may be a GLONASS system signal. The transmitted signal may be a cellular system signal. The transmitted signal may be a locally generated signal.

The method may further include, for example, electrically coupling the output signal to a buried object to generate a buried object current signal. The method may further include inductively coupling the output signal to a buried object to generate the buried object current.

The method may further include, for example, receiving a magnetic signal associated with the buried object current at a buried object locator, and determining information about the buried object current based at least in part on the phase of the buried object current. The information about the buried object current may include information about an indicated direction of flow of the buried object current relative to an orientation of the locator, such as an outward or inward indicated direction of current flow. The method may further include providing a display of the information about the buried object on a display of the locator. The display may be a graphical user interface (GUI) display or other display. The displayed information may be a textual or graphic display of the indicated direction of current flow.

The method may further include, for example, independently determining a second timing reference at the locator system. The information about the buried object current may be based in part on the second timing reference. The determining a second timing reference may include receiving a second transmitted signal including second timing information, and determining the second timing reference based at least in part on the second timing information. The second transmitted signal may be a satellite-based transmission. The satellite-based trans-mission may be a Global Positioning Satellite (GPS) system signal. The satellite-based transmission may be a GLONASS system signal. The second transmitted signal may be a cellular system signal. The second transmitted signal may be a locally generated signal.

In another aspect, the disclosure relates to a method for use in a buried utility locator system. The method may include, for example, receiving a magnetic field signal associated with a current in a buried object, wherein the magnetic field signal is generated with a phase based at least in part on a first timing reference determined from a first transmitted signal including first timing information. The method may further include receiving a second transmitted signal including second timing information and determining a second timing reference from the second timing information. The method may further include determining information related to the current in the buried object based on the received magnetic field signal and second timing reference.

The information related to a current may, for example, relate to a phase of the current. The information related to a current may relate to an indicated direction of current flow. The first and second transmitted signals may be satellite-based transmissions. The first and second transmitted signals may be Global Positioning Satellite (GPS) system signals. The satellite-based transmissions may be GLONASS system signals. The first and second transmitted signals may be cellular system signals. The first and second transmitted signals may be locally generated signals.

The locator signal may, for example, be electrically coupled to a buried object. The locator signal may be inductively coupled to the buried object. The locator signal may is synchronously detected based on the received timing information.

The method may further include providing a display of the current information on the locator. The current information may include a direction of indicated current flow in the buried object. The display may be a graphical user interface (GUI) display. The displayed information may be a textual or graphic display of the indicated direction of current flow.

In another aspect, the disclosure relates to a transmitter, such as a transmitter for use in a buried utility locator system. The transmitter may include, for example, a timing synchronization module including a timing receiver module configured to receive a first transmitted signal that includes timing information and a timing reference module to determine a timing reference from the timing information. The transmitter may further include an output signal generation module configured to generate an output signal having a phase determined at least in part by the timing reference. The timing synchronization module and/or output signal generation module may include one or more processing elements.

The transmitter may further include, for example, a coupling circuit configured to couple the output signal to a buried object to generate a buried object current. The coupling circuit may be configured to directly electrically couple the locator signal to the buried object. The coupling circuit may be an inductive coupling circuit configured to inductively couple the locator signal to the buried object.

The transmitter may further include a user interface module configured to receive one or more user inputs related to generation of the output signal. The timing receiver module may be configured to receive a satellite-based transmission including the timing information. The satellite-based transmission may be a Global Positioning Satellite (GPS) system signal. The satellite-based transmission may be a GLONASS system signal. The timing receiver module may be configured to receive a terrestrial transmission including the timing information. The terrestrial transmission may be a cellular transmission. The terrestrial transmission may be a locally generated transmission.

In another aspect, the disclosure relates to a locator for use in a buried utility locator system. The locator may include, for example, a locator receiver module for receiving a magnetic signal from a buried object associated with a current in the buried object, wherein the magnetic signal is generated with a phase based at least in part on a first timing reference determined from a first transmitted signal including first timing information. The locator may further include a timing synchronization module including a receiver module configured to receive a second transmitted signal that includes second timing information and a processor module configured to determine a second timing reference from the second timing information. The locator may further include a processing module including one or more processing elements configured to determine information related to the current in the buried object based on the received magnetic signal and the second timing reference.

The locator may further include a display module configured to textually and/or graphically display the information related to a current. The information related to a current may includes current phase. The information related to a current may include an indicated direction of current flow in the buried object. The display module may include a GUI configured to graphically display the information related to the current.

The locator receiver module may be configured to synchronously detect the locator signal emission based at least in part on the second timing information. The timing receiver module may be configured to receive a satellite-based transmission. The satellite-based trans-mission may be a Global Positioning Satellite (GPS) system signal. The satellite-based transmission may be a GLONASS system signal. The timing receiver module may be configured to receive a terrestrial transmission including the timing information. The terrestrial transmission may be a cellular transmission. The terrestrial transmission may be a locally generated transmission.

In another aspect, the disclosure relates to a computer readable medium including instructions for causing a computer to perform one or more of the following: receive a first transmitted signal that includes timing information; determine a timing reference from the timing information; generate an output signal having a phase determined at least in part by the timing reference; and send the output signal to a coupling apparatus.

In another aspect, the disclosure relates to a computer readable medium including instructions for causing a computer to perform one or more of the following: receive a magnetic signal associated with a current in a buried object, wherein the magnetic signal is generated with a phase based at least in part on a first timing reference determined from a first transmitted signal including first timing information; receive a second transmitted signal including second timing information; determine a second timing reference from the second timing information; and determine a current direction in a buried object based on the received locator signal and the second timing reference.

In another aspect, the disclosure relates to an apparatus for use in a buried utility locator system. The apparatus may include one or more of: means for receiving a transmitted signal that includes timing information; means for determining a timing reference from the timing information; and means for generating an output signal having a phase determined at least in part by the timing reference.

In another aspect, the disclosure relates to an apparatus for use in a buried utility locator system. The apparatus may include one or more of: means for receiving a magnetic signal associated with a current in a buried object, wherein the magnetic signal is generated with a phase based at least in part on a first timing reference determined from a first transmitted signal including first timing information; means for receiving a second transmitted signal that includes second timing information; means for determining a second timing reference from the second timing information; and means for determining an indicated direction of the buried object current based on the received magnetic signal and second timing reference.

In a typical application, a buried or hidden object may be a wire, pipe, or other conductor under the ground or in a wall, floor, etc that is coupled directly or indirectly to a current source from a buried object locator system transmitter. Alternately, in some applications, a magnetic dipole signal source, such as a sonde, may be introduced into a buried object such as a water or sewer pipe to generate a magnetic field to be sensed.

An exemplary embodiment of a locator system for locating the hidden or buried object includes a buried object transmitter, including one or more modules for receiving timing information (also denoted herein as a "transmitter" for brevity), as well as a corresponding buried object locator, also including one or more modules for receiving timing information (also denoted herein as a "locator" for brevity). Such a transmitter is typically configured to generate an output current signal to be coupled to and flow through the buried object to determine the location, "trace," or map of the buried object, typically over an area of ground or other surface, such as through a lawn, field, yard, road, or other area. The buried object may be located by measuring magnetic fields emitted due to the current flow in the locator and determining underground location information of the buried object based on the received information.

Additional information associated with the buried object may also be determined if the timing or phase of the current signal in the buried object can be controlled such that the transmitter and locator can be synchronized with respect to phase information of the current in the buried object. In an exemplary embodiment, the transmitter and locator may each include independent timing synchronization modules for receiving timing information from a timing reference, such as from a satellite system such as GPS or GLONASS, from a terrestrial system, such as from WWV or other terrestrial timing systems, from cellular systems, such as CDMA systems, LTE systems, or other cellular systems, and/or from a local timing system, such as a reference timing transmitter coupled to a time reference such as a rubidium clock, which may be located in a truck or other field test vehicle. Phase shifts or differences between the current coupled to the buried object (which may be synchronized with timing information received at a transmitter) may then be measured and compared with a second timing reference signal (which may be independently synchronized with second timing information received at a locator) to determine information related to current flow, such as directional information relative to the locator orientation. These signals may be denoted as being "phase-synchronized." By independently synchronizing the transmitter and locator, current directional information, as well as other information associated with the buried object, may be determined, displayed, transmitted from, and/or stored on the locator.

As used herein, the term "phase-synchronized" relates to a condition where, at a particular point in time or points in time, there is a known relationship that both the transmitter and the locator can use to make the signal phase at that point in time known so they can be compared. This may be done using an algorithm that relates the signal phases of two or more signals. Phase-synchronized does not imply that the various frequency signals need to have any simple phase relationship to each other at any point in time. For example, in an exemplary embodiment signals are phase-synchronized if the peak of one signal is aligned with the zero crossing of another signal at each zero seconds mark of a GPS receiver (as long as the locator and transmitter are both using that definition). As such, phase-synchronized signals have a nominal phase relationship at the transmitter and the locator which can be determined at each separate frequency through some known relationship. If multiple frequency signals are generated at a transmitter as described herein in some embodiments, the multiple signals need not be synchronized to each other but rather are synchronized between a transmitter and associated locator.

The following exemplary embodiments are provided for the purpose of illustrating examples of various aspects, details, and functions of apparatus, methods, and systems for locating buried or hidden objects; however, the described embodiments are not intended to be in any way limiting. It will be apparent to one of ordinary skill in the art that various aspects may be implemented in other embodiments within the spirit and scope of the present disclosure.

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Referring to FIG. 1, a system 100 on which embodiments of the present invention may be implemented is shown. System 100 may include a transmitter 160, which may include an antenna 162 and associated receiver module (not shown) to receive a signal that includes timing information. The received timing information may then be used to generate timing reference signals which may be further used to determine current flow information as described subsequently herein. In an exemplary embodiment, antenna 162 is a global positioning satellite system (GPS) antenna and is coupled to a GPS module (not shown) in transmitter 162. The GPS module may provide an output timing signal, such as a pulse output at one pulse per second (1 pps), 10 pps, or at another predefined frequency. Other configurations of timing synchronization modules may include a terrestrial radio timing system, a local timing system (i.e., a system where a local timing reference is generated and transmitted to both the transmitter and locator), or other devices capable of receiving a signal including timing information.

Transmitter 160 may be coupled to a buried object 112, which may be buried under the ground 110 (such as under a street, soil or grass, concrete, or other surface). A coupling apparatus 172 may be used to couple a phase-synchronized output current 170 of transmitter 160 to the object 112, such as via a direct connection or via inductive or other coupling (such as described subsequently with respect to FIGS. 2A-2C).

Figure 24:
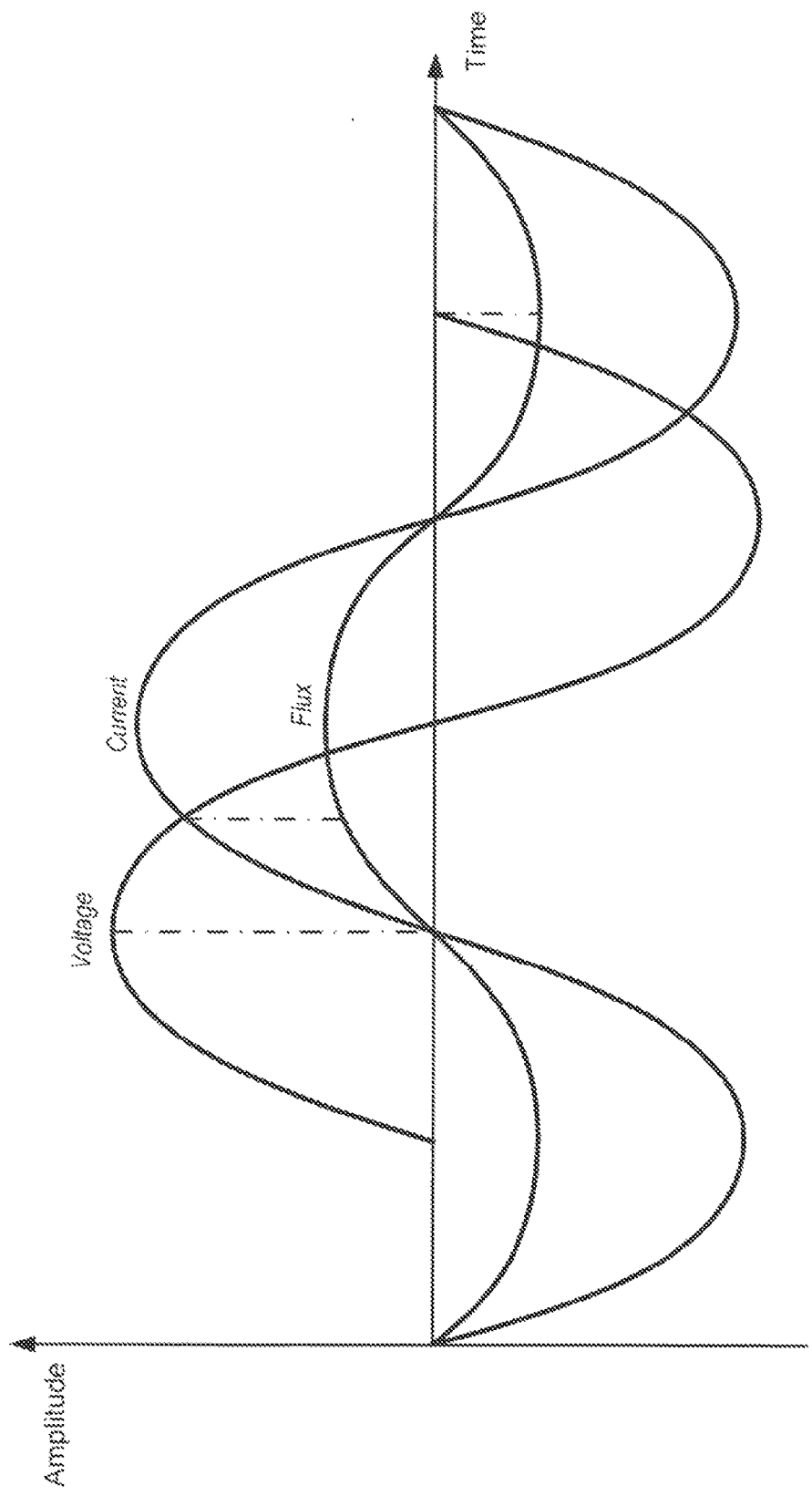
FIG. 24 illustrates example waveforms illustrating additional phase shifts associated with inductive locator sensors in a buried object locator system.

A corresponding locator 120 may be used to sense magnetic fields 116 generated by the current coupled to the buried object, such as by using locator antennas 140, which may comprise multiple antenna nodes or coils 142, 144, with the received magnetic field signals then processed in one or more circuits, which may be located in a housing 130 of locator 120. Signal processing may include signal adjustments for phase shifts or offsets in the received signal, such as shown in FIG. 24, filtering, noise reduction, and/or other signal processing as may be done in buried object locators.

Locator 120 may include an antenna 132 which may be similar to antenna 162 of transmitter 160, and may likewise have a receive module (not shown) coupled to the antenna 132 to receive and process a signal including timing information. For example, locator 120 may similarly receive GPS or other signals with timing information and may independently generate reference signals based on the received timing information.

Figure 2A:
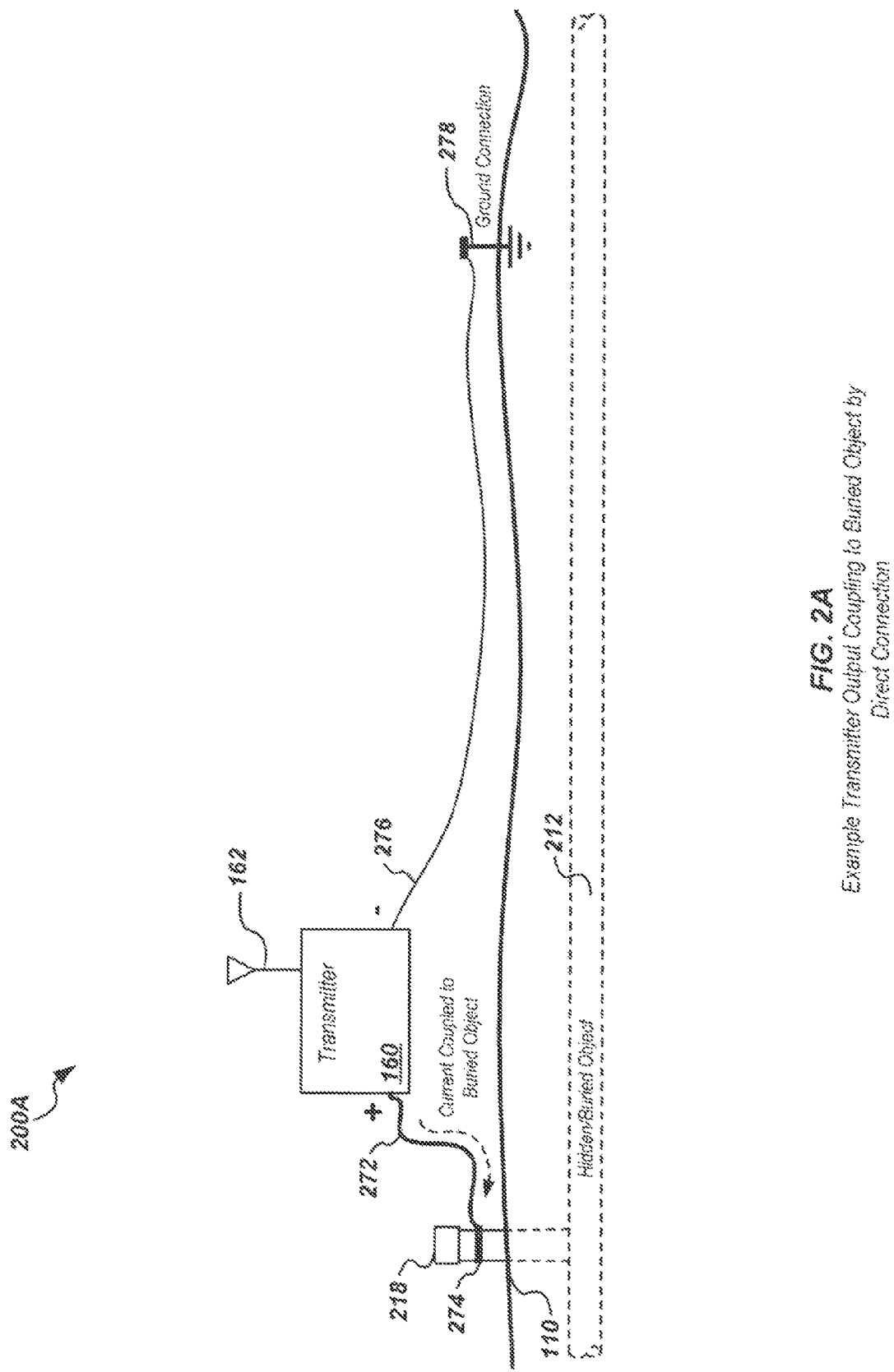
FIG. 2A illustrates details of one embodiment of a buried object transmitter and associated coupling of an output current to a buried object.
Figure 2B:
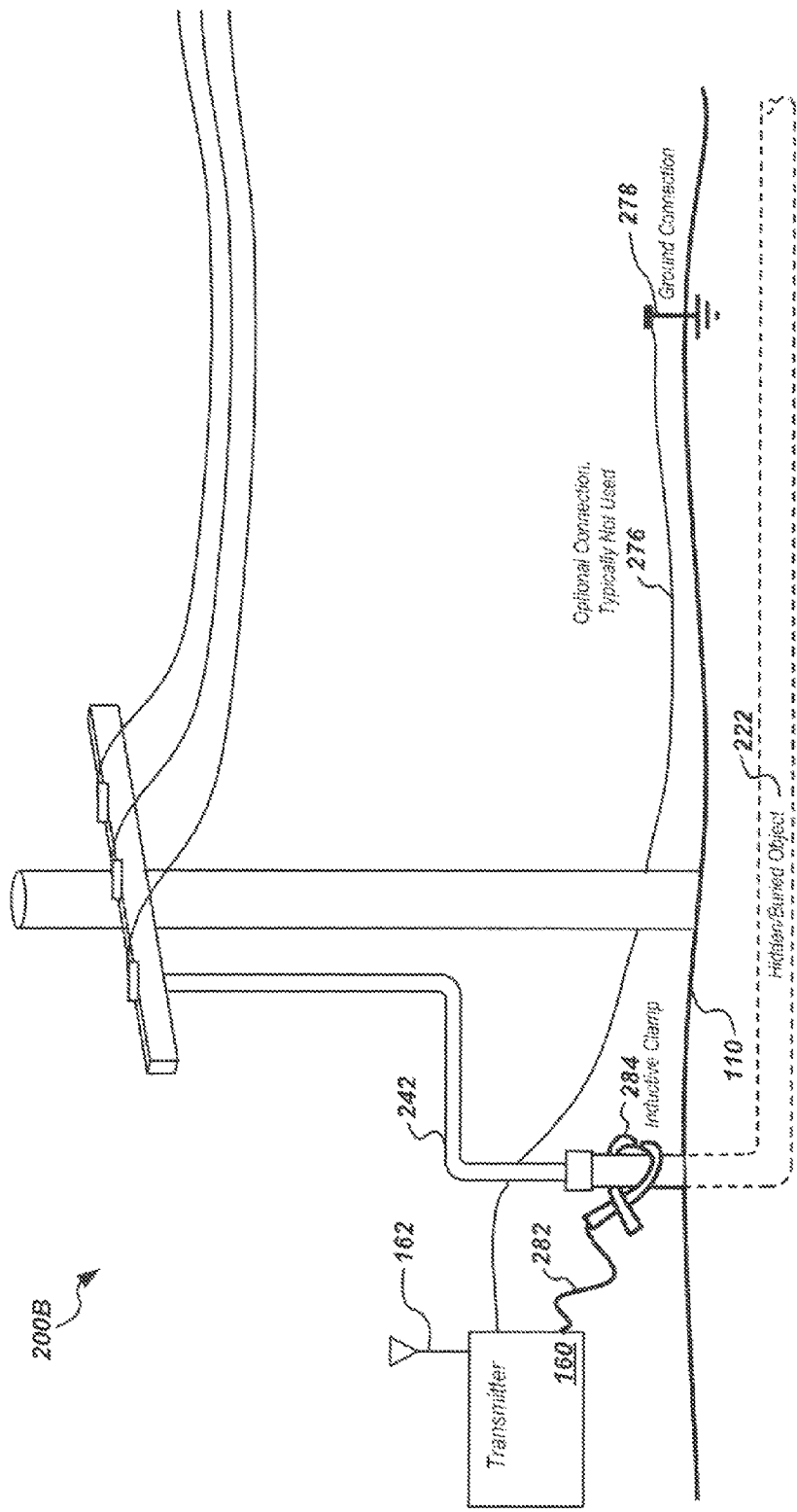
FIG. 2B illustrates details of another embodiment of a buried object transmitter and associated coupling of an output current to a buried object.

As noted previously, a buried object locator system transmitter, such as transmitter 160, may be configured to generate an output current signal at one or more predefined frequencies, which may then be coupled to the buried object. FIGS. 2A-2C illustrates details of various embodiments of coupling apparatus for coupling the output of a transmitter such as trans-mitter 160 to a buried object. It is noted that additional phase shifts, such as may be caused by inductive coupling between a transmitter output and a buried object, as well as inductive coupling at the locator antenna, may also be introduced, such as shown in FIG. 24. These additional phase shifts are omitted from the illustrations of FIGS. 2A-2C for purposes of simplicity in illustrating aspects of the disclosure.

FIG. 2A illustrates an example direct connection embodiment 200A where phase-synchronized output current is coupled from a transmitter 160 to an above-ground stub 218 of a buried pipe 212. In this configuration, a cable 272 and strap or other direct connection mechanism 274 may be used to physically attach a cable from a relative phase connection such as a zero phase connection of the transmitter to the stub. An opposite phase connection at the transmitter may be coupled, such as via a cable 276, to a ground connection 278, which may be a metal stake pounded into the ground, or to a rod, pipe, or other grounded object or connection. In this configuration current can be viewed as flowing from the positive polarity connection through the buried object 212 and returns to the ground connection 278 through the dirt or other material. The return path is governed by characteristics of the ground, such as the shape of the terrain and the soil connectivity. The current flow reverses each half cycle of the waveform.

FIG. 2B illustrates an example inductive coupling embodiment 200B, where phase-synchronized output current is inductively coupled to buried object 222, which in this case may be an underground conduit or other structure with power transmission lines, phone lines, or other electrical or optical cables, etc. A conduit 242 may enclose cables from the ground to an overhead power transmission line as shown. A cable 282 and an inductive clamp, such as clamp 284 as shown, may be used to inductively couple current from transmitter 160 into the buried object. A cable 276 and ground connection 278 may optionally be used but are usually not used in this configuration. Similarly, FIG. 2C illustrates another inductive coupling embodiment 200C, where in this case the transmitter output is coupled to a buried object 232 in an underground utility vault 290 using an inductive clamp 284 as shown.

Figure 3:
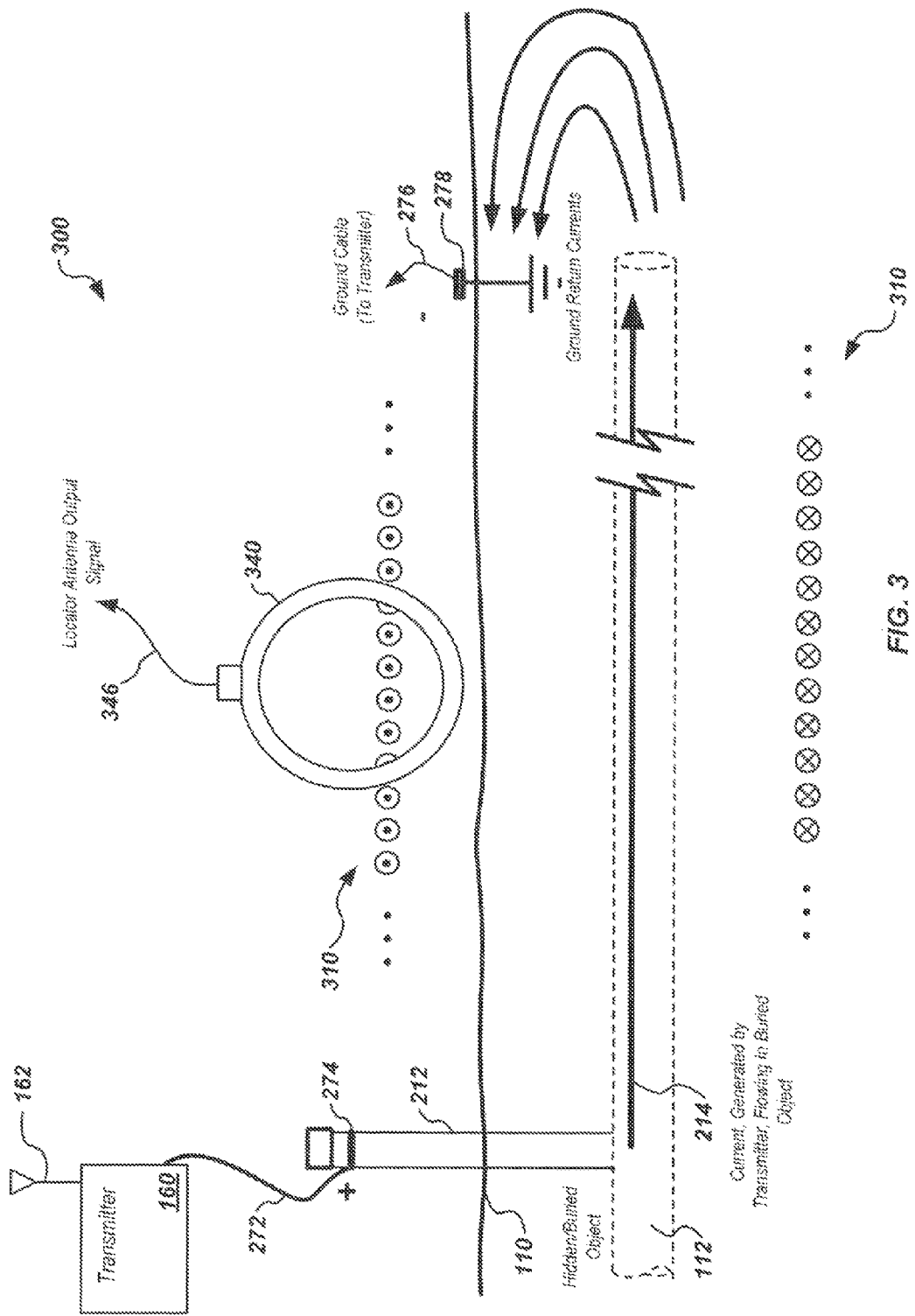
FIG. 3 illustrates details of an embodiment of a buried object locator system showing coupling of a current from a transmitter and sensing of magnetic field signals associated with the current with a locator antenna.

FIG. 3 illustrates details of an embodiment of a system 300 where a phase-synchronized output current from transmitter 160 is directly coupled to a buried object 112 having an above-ground stub or conduit 218, similarly to the configuration illustrated in FIG. 2A. A coupled current 214, as generated in transmitter 160, flows in the buried object 112 as shown. At a termination of the buried object or associated conductive path, the current 214 may return to a ground terminal 278, such as through the surface or associated ground. The particular ground path size and shape will be determined based on properties of the soil or other ground material, such as the shape, conductivity, other buried objects, and the like. Current returned to ground terminal 278 may then be coupled via a cable or other conductor 276 to transmitter 160.

A magnetic field 310 is generated by current 214 such as shown in FIG. 3. The magnetic field may be sensed by a locator antenna 340, which may include one or more coils or other magnetic field antenna configurations in a buried object locator such as locator 120 shown in FIG. 1. A locator output signal from antenna 340 may be coupled via a connection 346 to additional electronics in the locator, such as described subsequently herein. Examples of locator output signals in one embodiment are shown in FIGS. 4A-4D. It is noted that the locator signals in FIGS. 4A-4D are shown as being sinusoidal and noise free for purposes of illustration, however, in actual implementations, the waveforms may include noise and/or other distortions, and may have other waveform shapes in additional to pure sinusoids as shown.

Figure 4A:
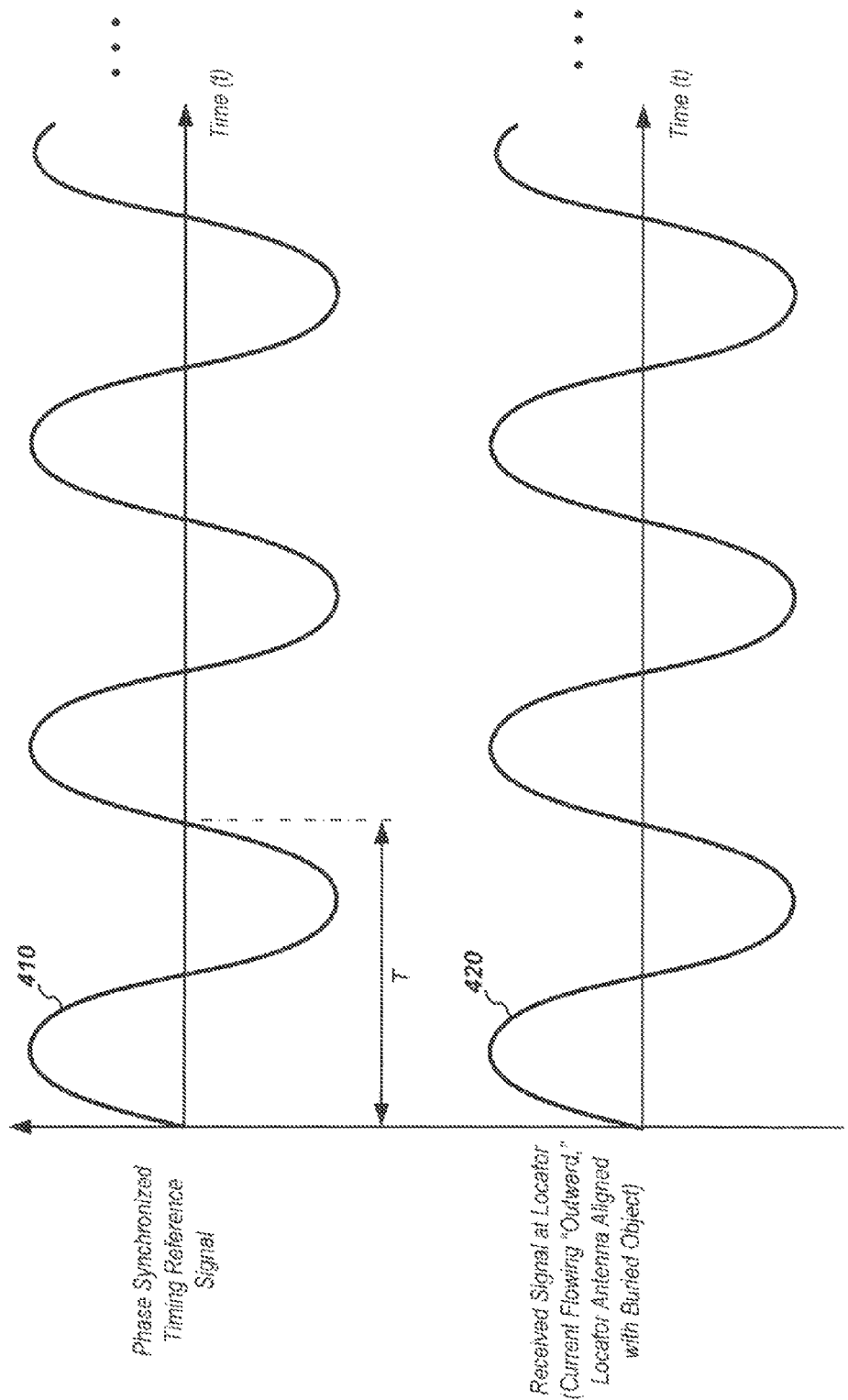
FIG. 4A illustrates details of example signals in an embodiment of a buried object locator that may be processed to determine an "outward" direction of current flow in a buried object.

For example, FIG. 4A illustrates a locator output signal 420 which may be generated from a locator antenna such as shown in FIG. 3, and may be processed to remove noise, distortion, phase offsets, and the like. Phase-synchronized timing reference signal 410 may be a signal generated from received timing information at a locator, such as an output from a GPS module or other timing module. If the current in the buried object is similarly phase-synchronized based on independently received timing information, such as from a corresponding GPS module or other module in the transmitter, the phase of the two signals may be compared to determine information about the current flowing in the buried object. In the example of FIG. 4A, if the locator is positioned so as to be aligned with the buried object and oriented in a direction outward from the transmitter (relative to the current flow), the phase difference will often be substantially zero as shown in FIG. 4A. Conversely, as shown in FIG. 4B, if the locator is aligned with the buried object and oriented in a direction toward the transmitter (relative to the current flow), the phase difference between locator signal 430 and reference signal 410 will often be approximately 180 degrees. Other alignments, such as at an angle to buried object, may also be sensed by doing a similar phase comparison as shown in FIG. 4C between a timing reference signal 410 and locator signal 440 as shown, where the phase difference may be determined as $(2\pi \tau 1/T)$ radians.

Figure 4D:
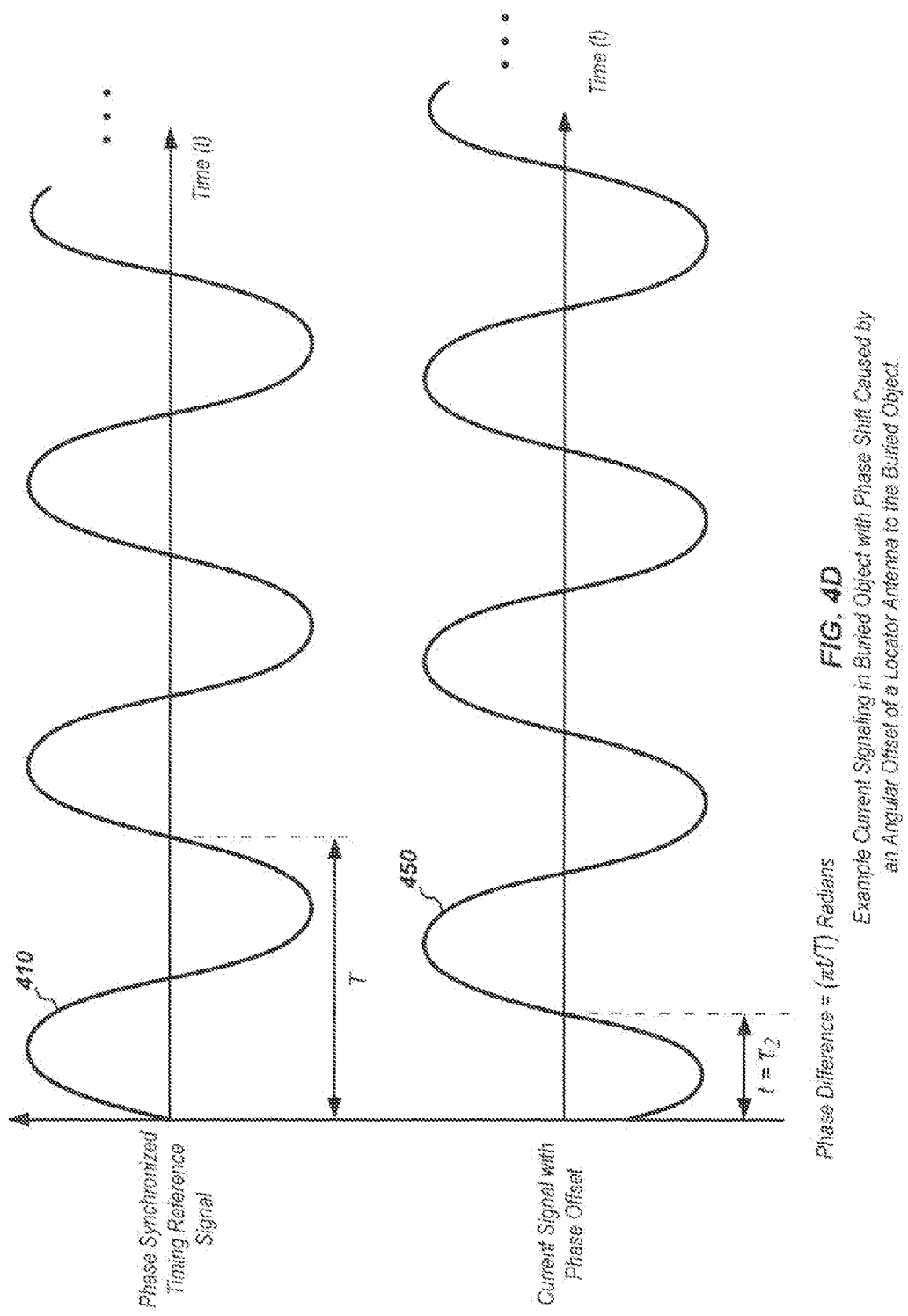
FIG. 4D illustrates details of example signals in an embodiment of a buried object locator that may be processed to determine an angular offset of the locator with respect to a direction of current flow in a buried object.

In some coupling configurations, a phase shift of the current (relative to a voltage signal having a synchronized phase) may occur due to impedance in the conductive connection. This phase shift will offset the current phase relative to the desired reference phase. An example phase offset is shown in FIG. 4D, where the current signal is offset by $(2\pi \tau 1/T)$ radians. As described subsequently herein, a coupling impedance phase shift (and/or other phase shifts) may be corrected in a transmitter feedback circuit and/or may be measured and reported to a corresponding locator to correct for phase shifts at the transmitter. Examples of such processing are described subsequently herein.

Figure 5:
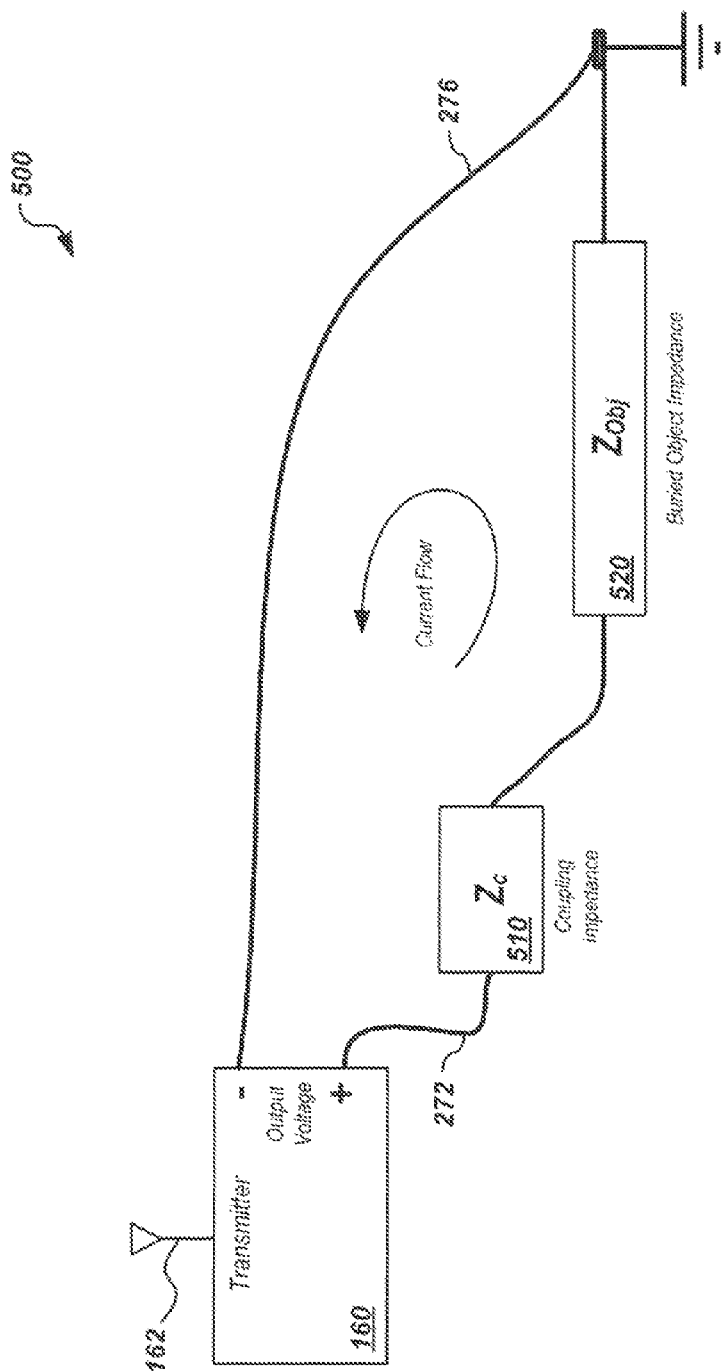
FIG. 5 illustrates details of an example circuit for modeling current phase shift in a buried object locator system due to coupling impedance.

FIG. 5 illustrates an example circuit for modeling such a coupling impedance as impedance 510. The buried object may be modeled as an impedance 520 as shown. Although the buried object may be viewed as a transmission line, due to the relatively low frequencies typically used (e.g., on the order of 100 Hz to 100 KHz), the wavelength of the current signal is typically much longer than the distance from the transmitter to the locator, thereby making the phase at the two positions substantially the same.

Figure 6:
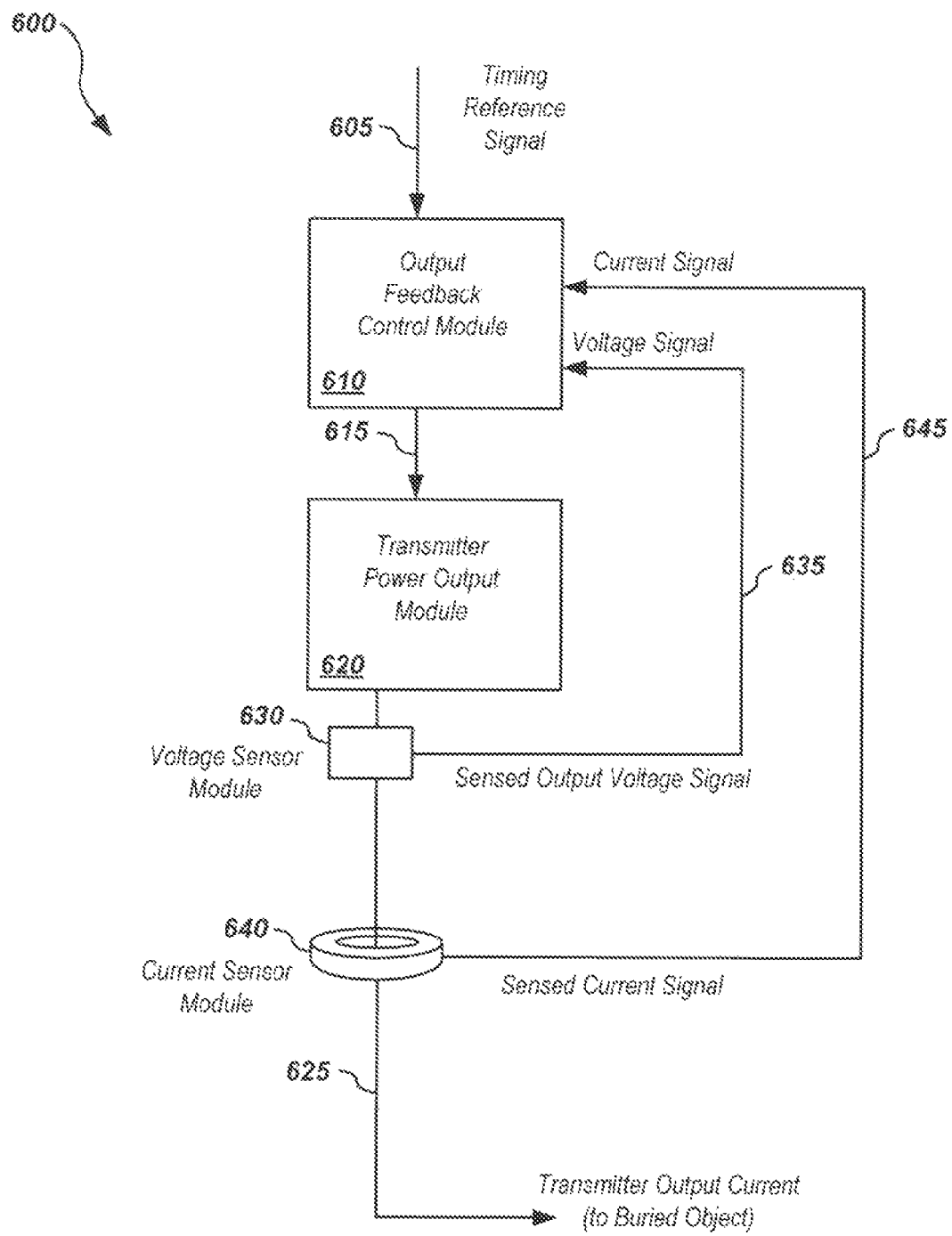
FIG. 6 illustrates details of an embodiment of a circuit for measuring and controlling output current to provide a phase-synchronized current signal to a buried object.

FIG. 6 illustrates an embodiment of a circuit 600 for measuring and controlling output current phase for synchronization in the buried object transmitter, such as transmitter 160. In the embodiment of circuit 600, a coupling phase offset, such as described with respect to FIG. 4D, may be sensed and cancelled in a closed loop feedback control module 610. As shown in FIG. 6, a timing reference signal 605 may be provided to module 610. A signal with phase-synchronized to the timing reference signal 605 may be generated and provided to power output module 620, which may be a power amplifier (PA) or other output circuit. The output current 625 may be sensed with a current sensor module 640, which may be a current transformer and associated electronic components. The sensed current signal 645 may be provided to the control module 610, along with a sensed voltage signal 635, which may be sensed by a voltage sensor module 630. The control module 610 may then adjust the output current so as to match the phase of the current with the received timing reference signal (rather than matching the output voltage). In this way, the current provided to the buried object may be phase-synchronized with the timing information and processed at an associated locator, such as described in FIG. 17.

Figure 7:
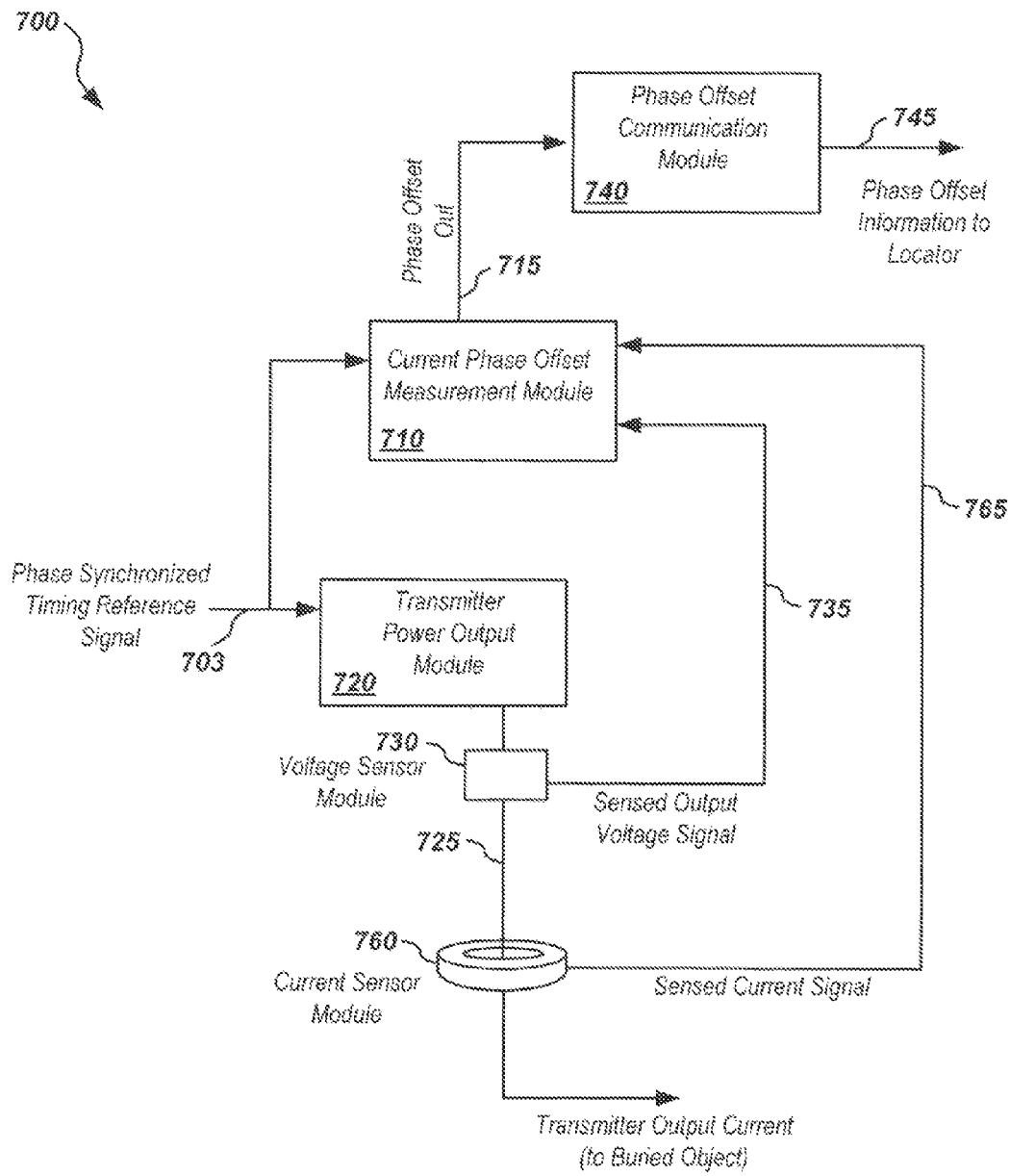
FIG. 7 illustrates details of an embodiment of a circuit for measuring and providing a phase offset from a transmitter to a locator to adjust for coupling impedance and/or other phase offsets in a current signal.

In another embodiment of a circuit 700 as shown in FIG. 7, rather than synchronizing the output current 725, the phase offset may be measured in a phase offset measurement module 710 and sent from communication module 740 to a corresponding locator as phase offset information 745. In this configuration, rather than adjust the output current to compensate for coupling impedance and/or other phase offsets, the phase offset information is sent to the locator where it may be used to adjust the received locator signal phase.

For example, in circuit embodiment 700, a phase-synchronized timing reference signal 703 may be generated and provided to transmitter power output module 720, which may be a power amplifier (PA) or other output circuit. Signal 703 may be the same as or similar to signal 605 of FIG. 6. Transmitter module 720 may generate a phase-synchronized output current 725, which may then be sensed with a voltage sensor module 730 and a current sensor module 760, which may be a current transformer and associated electronic components. The sensed voltage signal 735 and sensed current signal 765 may be provided to the current phase offset measurement module 710 to determine a phase offset. The offset module 710 may then provide phase offset information 715 to a phase offset communication module 740, which may be a wired or wireless communication module. For example, an ISM radio communication module or wired serial communication module may be used. Module 740 may then provide phase offset information 745 to an associated locator, such as locator 120 of FIG. 1, for use in processing received magnetic field signals generated from the buried object. In this way, rather than adjusting current at the transmitter as in circuit embodiment 600, information for correcting for current offset is provided to the locator, with offset adjust processing then done in the locator such as described in FIG. 18.

Figure 8:
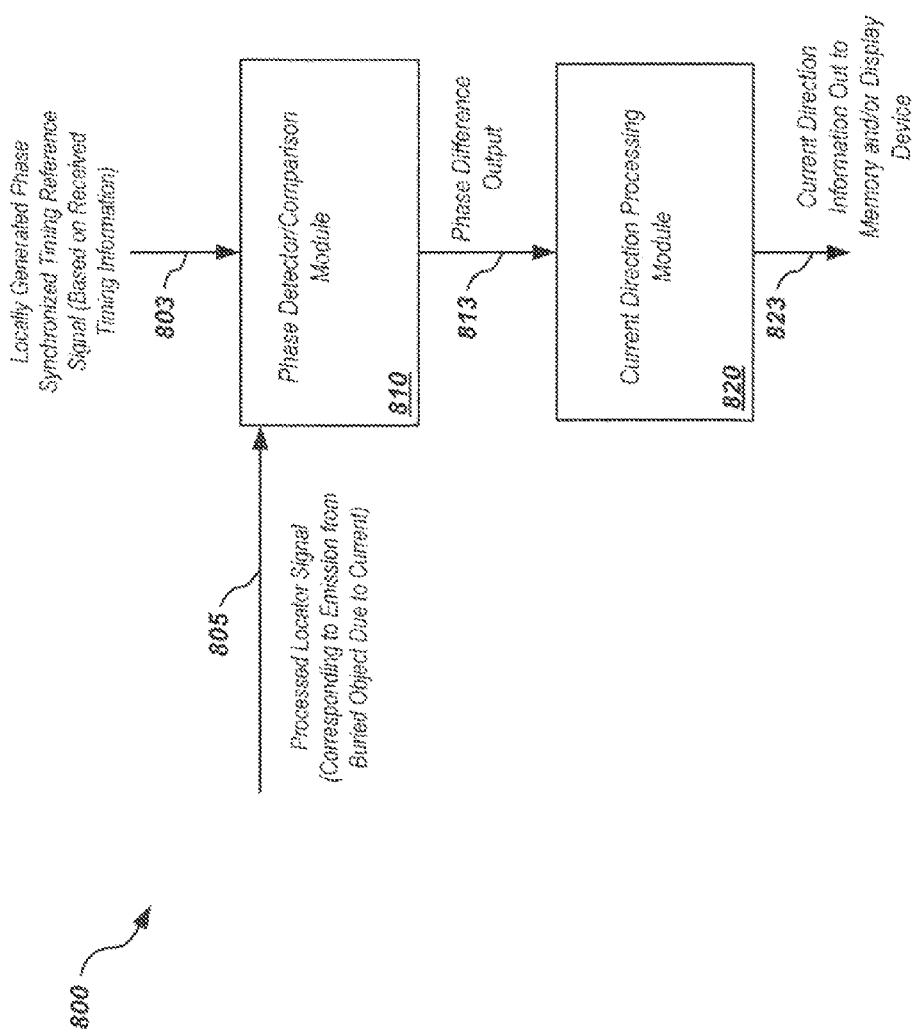
FIG. 8 illustrates details of an embodiment of a circuit for receiving and processing a locator signal corresponding to magnetic fields from a current in a buried object.

FIG. 8 illustrates details of an embodiment of a locator processing circuit 800 for receiving and processing a locator signal associated with current in a buried object. Circuit 800 may be implemented in a buried object locator such as locator 120 as shown in FIG. 1, and may be used in conjunction with a transmitter such as transmitter 160. For example, a transmitter apparatus such as shown in FIG. 6 may be used to generate and output a phase-synchronized current to a buried object, and a corresponding magnetic field may be received by a locator antenna, such as antenna 340 as shown in FIG. 3, and further processed in the locator to generate processed locator signal 805. Signal 805 may be provided to a phase detection/comparison module, along with a locally generated phase-synchronized timing reference signal 803, which may then be compared in module 810 to the received locator signal to determine a phase difference. A phase difference output signal 813 may then be generated, such as by comparing the phase of signals 805 and 803 to determine a phase difference. The output signal may then be provided to a current direction processing module, where it may be further processed to determine a direction of the current flowing in the buried object (relative to an orientation of the locator antenna). In addition, other inputs (not shown) may be provided to module 820, such as inertial inputs from accelerometers, compass devices, position sensors, and/or other sensor inputs for use in determining current information.

An output signal 823 may then be provided from module 820, which may include information associated with the buried object current, such as direction, amplitude, phase information, and/or other information. This information may be used by a display module to generate displays of current flow and/or other information associated with the current and/or buried object.

Figure 9:
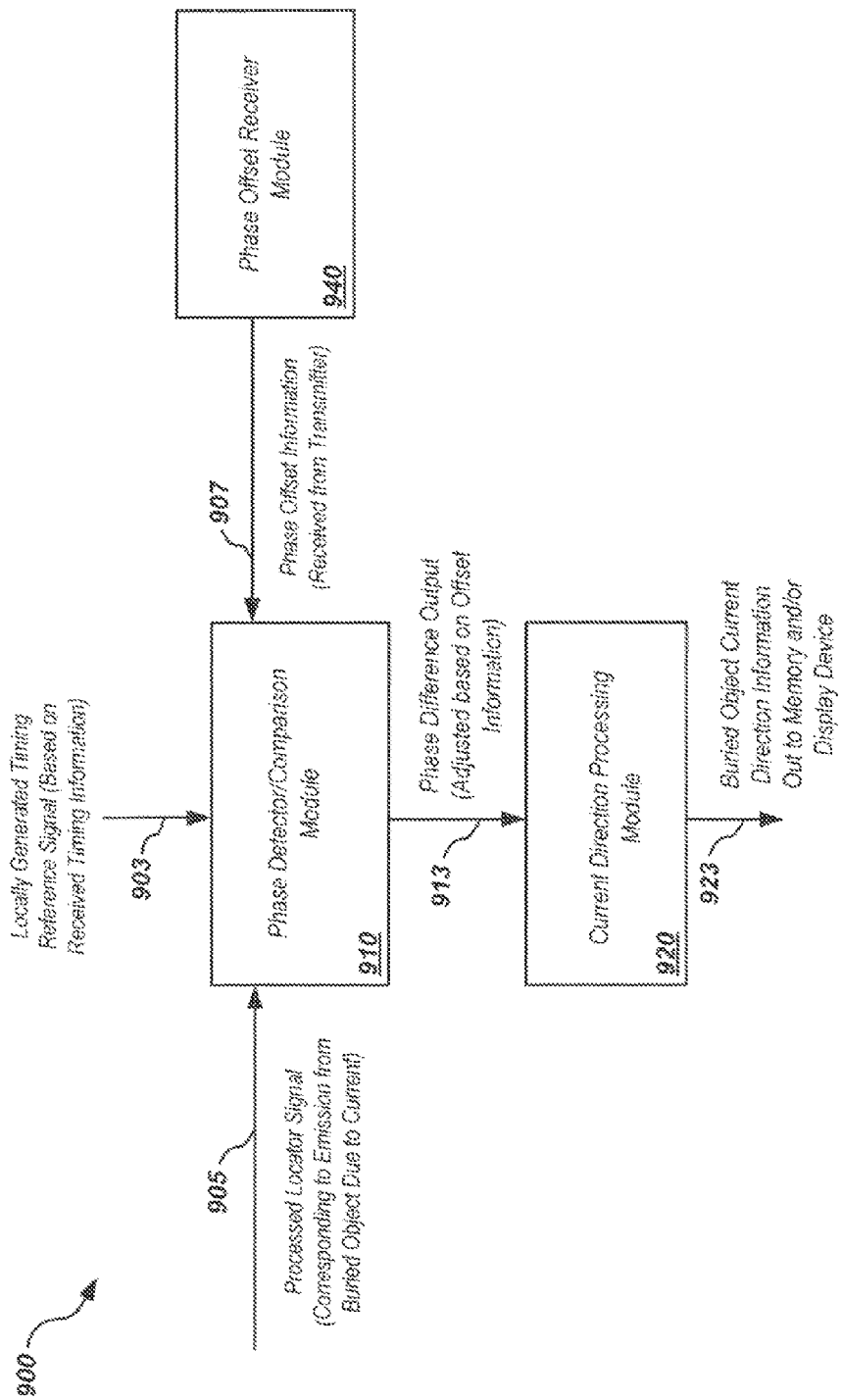
FIG. 9 illustrates details of an embodiment of a circuit for receiving and processing a locator signal corresponding to magnetic fields from a current in a buried object, along with adjusting for a phase offset.

FIG. 9 illustrates another embodiment of details of a locator processing circuit embodiment 900 for receiving and processing a locator signal associated with current in a buried object, along with phase offset information. This circuit may be used in conjunction with a transmitter apparatus, such as shown in FIG. 7, to receive phase offset information and process the received locator signal by adjusting the outputs based on the offset information. For example, a locator signal 905 may be received from a locator antenna, similarly to as described with respect to FIG. 8, at phase detector/comparison module 910. In addition, a phase offset receiver module 940 may be configured to receive phase offset information from a transmitter, which may be generated as shown in FIG. 7, and provide the phase offset information as a signal 907 to module 910. A phase difference may be generated by comparing the phase of signal 905 and 903, with further adjustment based on phase offset signal 907. A phase difference output 913 may be generated and provided to a current direction processing module 920, which may provide similar processing and output to that provided by module 920 of FIG. 8. Buried object current information 923, such as amplitude, phase, indicated direction, may be provided as an output for display, storage, and/or transmission from module 920.

Figure 10:
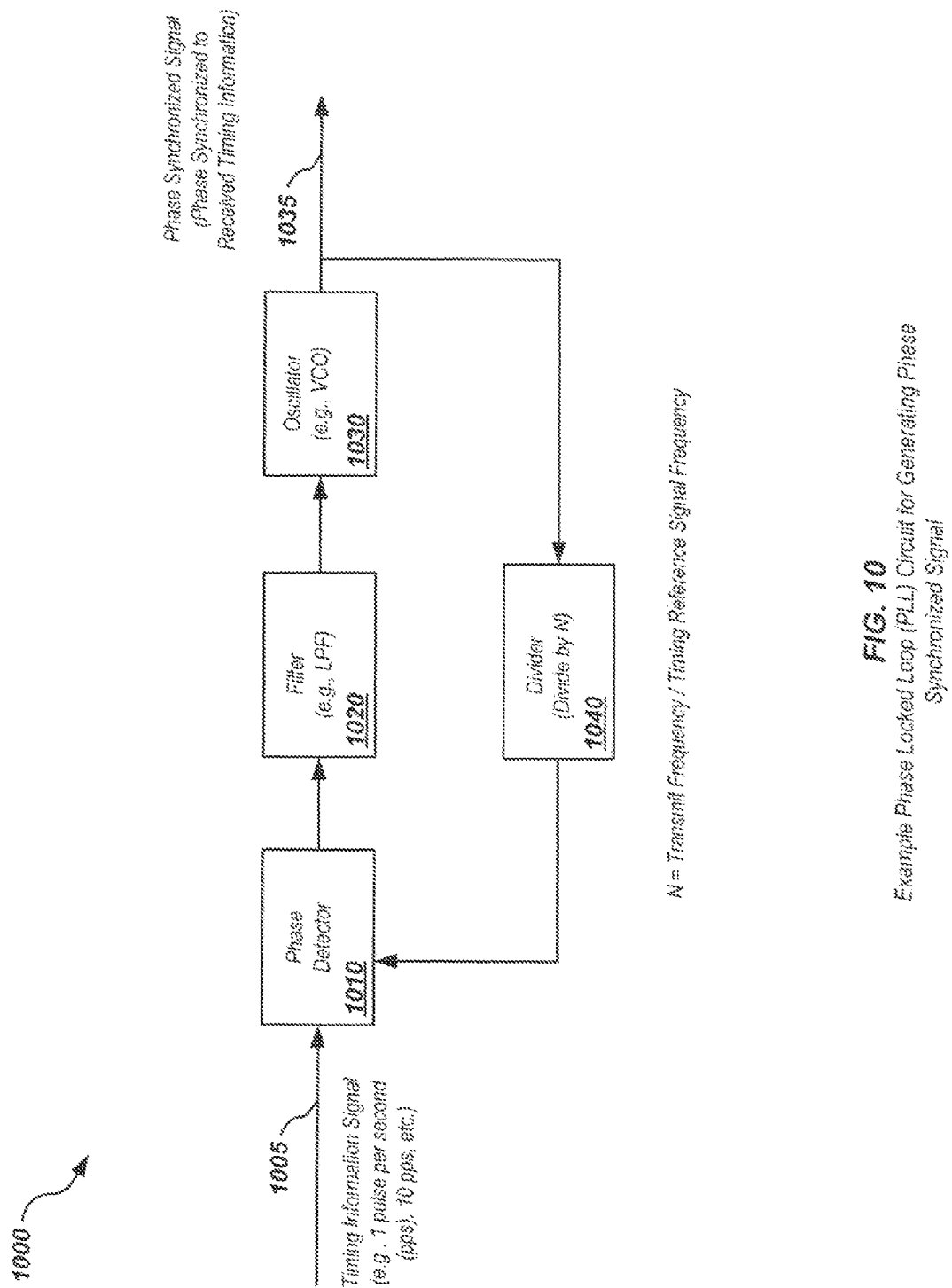
FIG. 10 illustrates details of an embodiment of a phase locked loop (PLL) circuit for generating a phase-synchronized signal for use in a buried object transmitter or locator.

FIG. 10 illustrates details of an embodiment of a phase-locked loop (PLL) circuit 1000 for generating a phase-synchronized timing reference signal from received timing information. For example, the received timing information signal 1005, such as in the form of an output from a GPS module or other timing module, may be provided to a phase detector 1010. The timing information may be in the form of a periodic pulse signal, such as a one pulse per second (1 PPS) or other periodic timing signal. The timing information signal may be compared to an output of a divider circuit 1040, which may be set to a division ratio associated with a desired transmitter output frequency. For example, in an exemplary embodiment, a base frequency of 710 Hz may be used, as well as multiples of the base frequency, such as 7,810 Hz=(710×11), 85,910 Hz (for an HF direct connection)=(710×121), 93,720 Hz (for an HF induction connection)=(710×132). Other frequencies may alternately be used in various embodiments.

A loop filter 1020, such as a lowpass filter (LPF), may be used to filter the output of phase detector 1010, and a oscillator 1030, such as a voltage controlled oscillator (VCO) may receive the output of filter 1020 as a control input and generate an output signal 1035, which may then be provided as a phase-synchronized signal to an output circuit of a transmitter, such as transmitter 160, to generate a phase-synchronized output current to be provided from the trans-mitter to a buried object, such as shown in FIGS. 5 and 6.

In addition, a similar circuit may be used in a corresponding locator to generate an independent phase-synchronized signal to be compared to a received locator signal (e.g., a magnetic field signal from a phase-synchronized current output signal in a buried object or sonde), such as shown in FIGS. 8 and 9.

Figure 11:
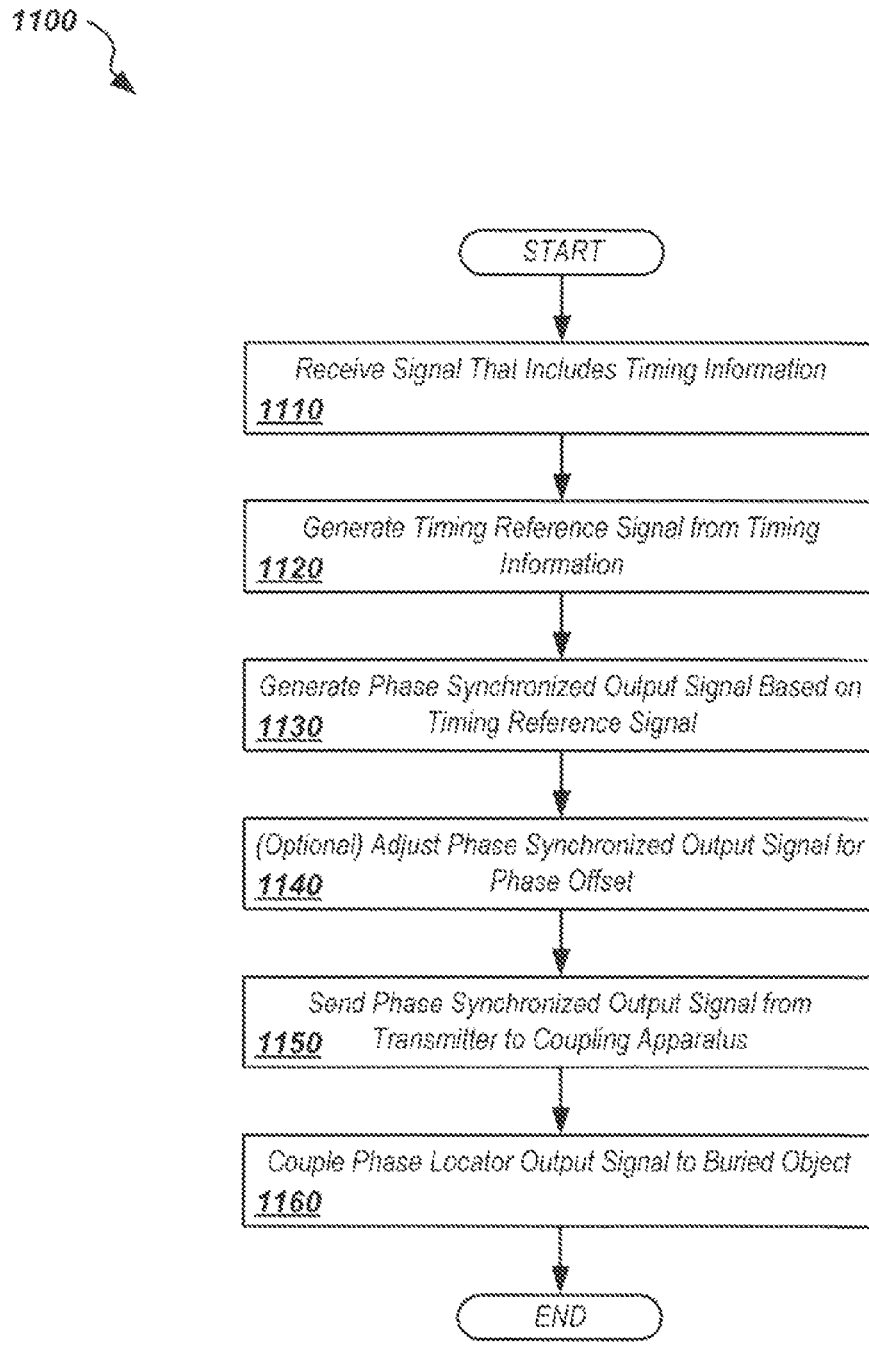
FIG. 11 illustrates details of an embodiment of a process for generating phase-synchronized output signals in a buried object transmitter.
Figure 15:
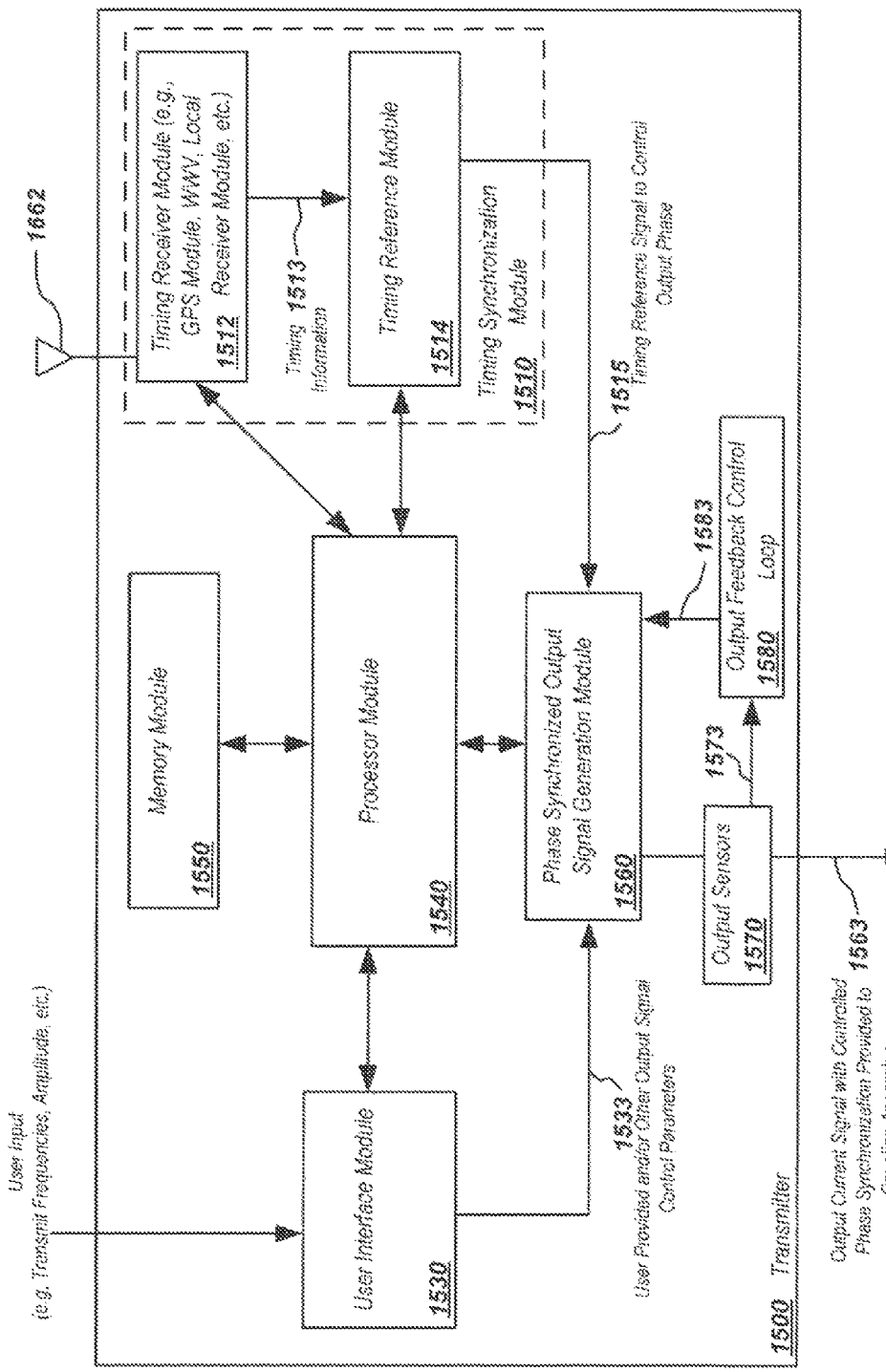
FIG. 15 illustrates details of an embodiment of an apparatus for use in a buried object transmitter to generate a feedback controlled output current signal.

FIG. 11 illustrates details of an embodiment of a process 1100 for generating a phase-synchronized output signal, such as in a circuit as shown in FIG. 6 and/or in a device such as transmitter 1500 of FIG. 15. Process 1100 may be implemented, for example, in a module in a buried object transmitter, such as transmitter 1500 of FIG. 15.

At stage 1110 a signal that includes timing information may be received at the transmitter. The signal may be, for example, a GPS signal or other signal with timing information, such as a terrestrial cellular or locally generated signal. The signal may be received in a timing receiver module, such as module 1512 as shown in FIG. 15. The timing information may be extracted and used to generate a timing reference signal at stage 1120. This may be done in various ways. In one embodiment, a timing output in the form of a periodic pulse signal (e.g., 1 PPS or other standard timing signal rate), such as described in FIG. 10, may be generated. At stage 1130, a phase-synchronized output signal may be generated, based on the timing reference signal, such as illustrated in FIG. 10.

The phase-synchronized output signal may then optionally be adjusted at stage 1140, such as through a feedback circuit such as shown in FIG. 6, to adjust for phase offsets due to coupling impedance and/or other causes. The phase-synchronized output signal may then be provided from the transmitter at stage 1150 to a coupling apparatus, such as shown in FIGS. 2A-2C, to couple the output current signal to a buried object. At stage 1160, the current may be coupled to the buried object and will then flow in the buried object, where corresponding magnetic field emissions may be detected by a locator. Based on phase comparisons and/or other processing at the locator, information associated with the current, such as amplitude, phase, indicated direction, and the like may be determined, stored, displayed, and/or transmitted from the locator.

Figure 12:
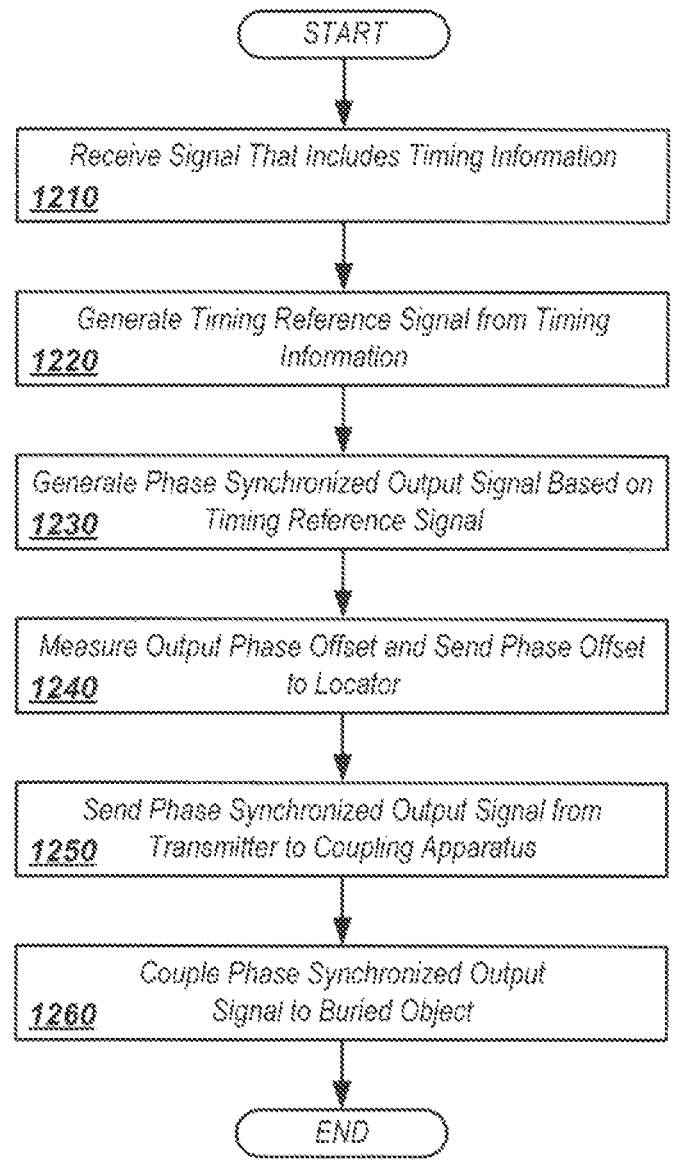
FIG. 12 illustrates details of an embodiment of a process for generating phase-synchronized output signals in a buried object transmitter.
Figure 16:
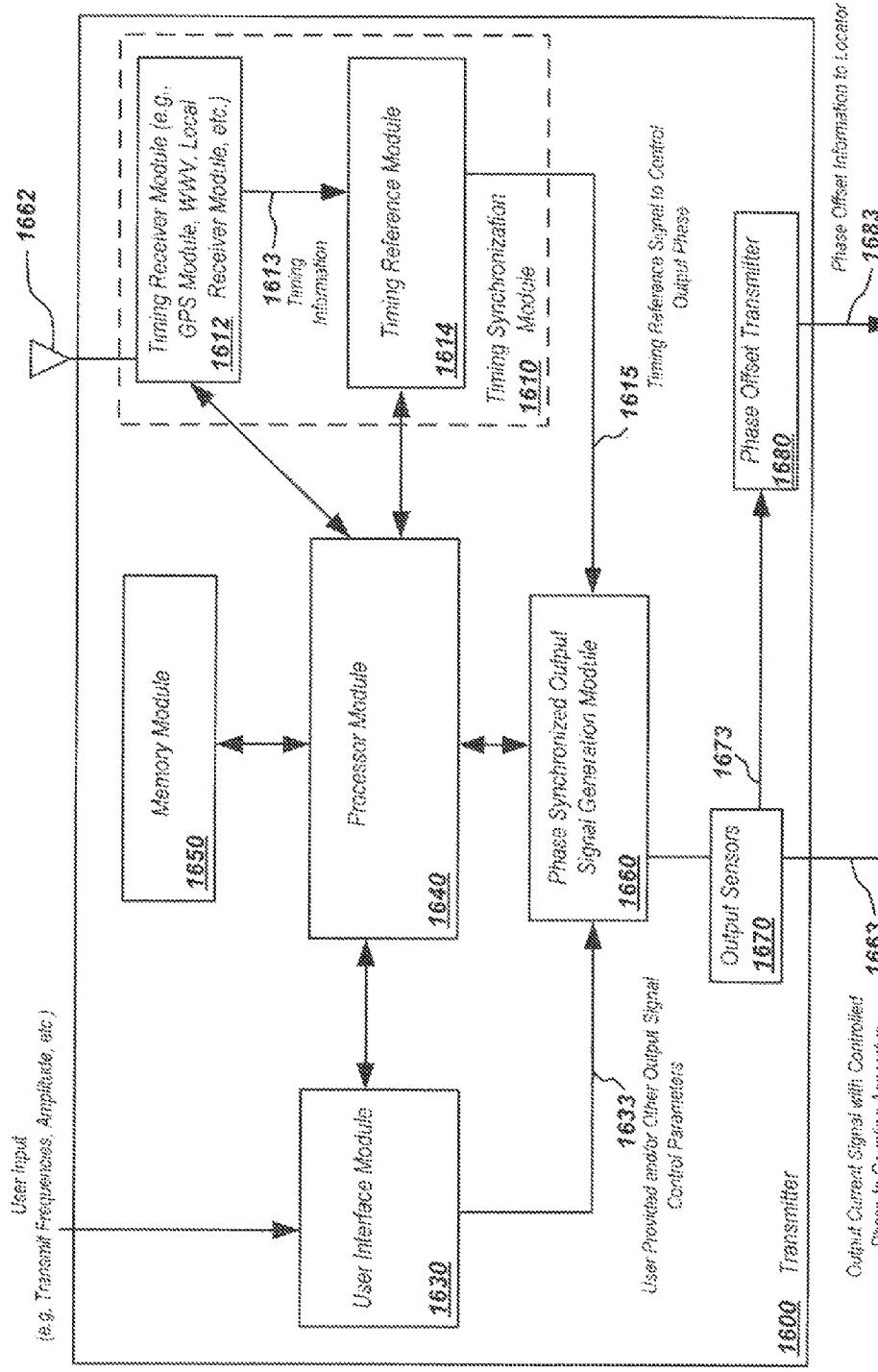
FIG. 16 illustrates details of an embodiment of an apparatus for use in a buried object transmitter to generate a controlled output current signal and send phase offset information to a locator.

FIG. 12 illustrates details of an embodiment of an alternate process 1200 for generating a phase-synchronized output signal, such as in a circuit as shown in FIG. 7 or in a trans-mitter such as transmitter embodiment 1600 of FIG. 16. Process 1200 may be implemented, for example, in a module in a buried object transmitter, such as transmitter 1600 of FIG. 16.

Process 1200 may proceed similarly to process 1100, except that a phase offset may be measured (rather than corrected for as shown in process 1100) at stage 1240. The phase offset information may then be sent to a corresponding locator, such as illustrated in FIG. 7 or FIG. 16. For example, at stage 1210 a signal that includes timing information may be received at the transmitter. The signal may be, for example, a GPS signal or other signal with timing information, such as a terrestrial cellular or locally generated signal. The signal may be received in a timing receiver module, such as module 1612 as shown in FIG. 16. The timing information may be extracted and used to generate a timing reference signal at stage 1220. This may be done in various ways. In one embodiment, a timing output in the form of a periodic pulse signal (e.g., 1 PPS or other standard timing signal rate), such as described in FIG. 10, may be generated. At stage 1230, a phase-synchronized output signal may be generated, based on the timing reference signal, such as illustrated in FIG. 10. At stage 1240 a phase offset may be measured and sent, via a wired or wireless connection, to a corresponding locator, such as from module 1680 of FIG. 16. The phase-synchronized output signal may then be provided from the transmitter at stage 1250 to a coupling apparatus, such as shown in FIGS. 2A-2C, to couple the output current signal to a buried object. At stage 1260, the current may be coupled to the buried object and will then flow in the buried object, where corresponding magnetic field emissions may be detected by a locator. Based on phase comparisons and/or other processing at the locator, information associated with the current, such as amplitude, phase, indicated direction, and the like may be determined, stored, displayed, and/or transmitted from the locator.

Figure 13:
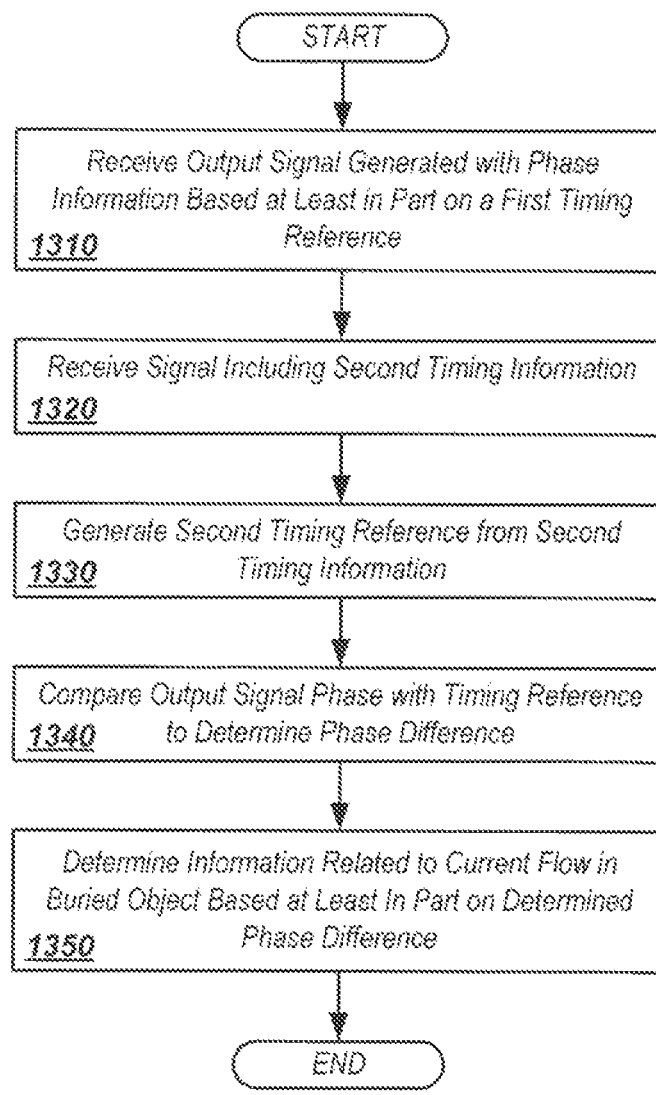
FIG. 13 illustrates details of an embodiment of a process for receiving and processing phase-synchronized signals in a buried object locator.

FIG. 13 illustrates details of an embodiment of a process 1300 for receiving and processing a phase-synchronized signal in a locator, such as locator 120, where the signal may be from a magnetic field signal emitted from a phase-synchronized current flowing in a buried object. As the current flow direction is effectively derived from a phase relationship and since the current signal is an alternating current (AC) signal and the actual current direction reverses on each half cycle of the AC waveform, the current flow can be described relative to a flow direction (e.g., outward or inward) as an "indicated" direction of current flow. On a typical buried object locator device the current can be displayed in this way on a graphical user interface (GUI) using directional arrows, hash lines, moving "ants" or similar directional indicators. Process 1300 may begin at stage 1310, where an output signal may be received in a locator. The signal may be based on a magnetic field signal received at the locator from a phase-synchronized current flow in a buried object, generated by a corresponding transmitter, such as transmitter 160. The signal may be phase-synchronized at the transmitter based on timing information received at the transmitter from a first timing signal, such as a GPS signal. The phase-synchronized signal may be processed, such as to filter noise and/or otherwise adjust the received signal.

At stage 1320, a signal including second timing information may be received at the locator, such as from a GPS or terrestrial communication. At stage 1330, a second timing reference signal may be generated at the locator based on the received second timing information. At stage 1340, the phase of the phase-synchronized output signal and the second timing reference signal may be compared. This comparison may be used to determine a relative phase offset or difference between the signal sent from the transmitter, based on the first timing information, and a second, independently generated timing reference signal generated at the locator based on the second timing information. By doing such a comparison, phase shifts, such as illustrated in FIGS. 2A-2C, may be determined, thereby providing information regarding an indicated direction of current flow in the buried object, and/or the orientation of the locator relative to the buried object at stage 1350.

Figure 14:
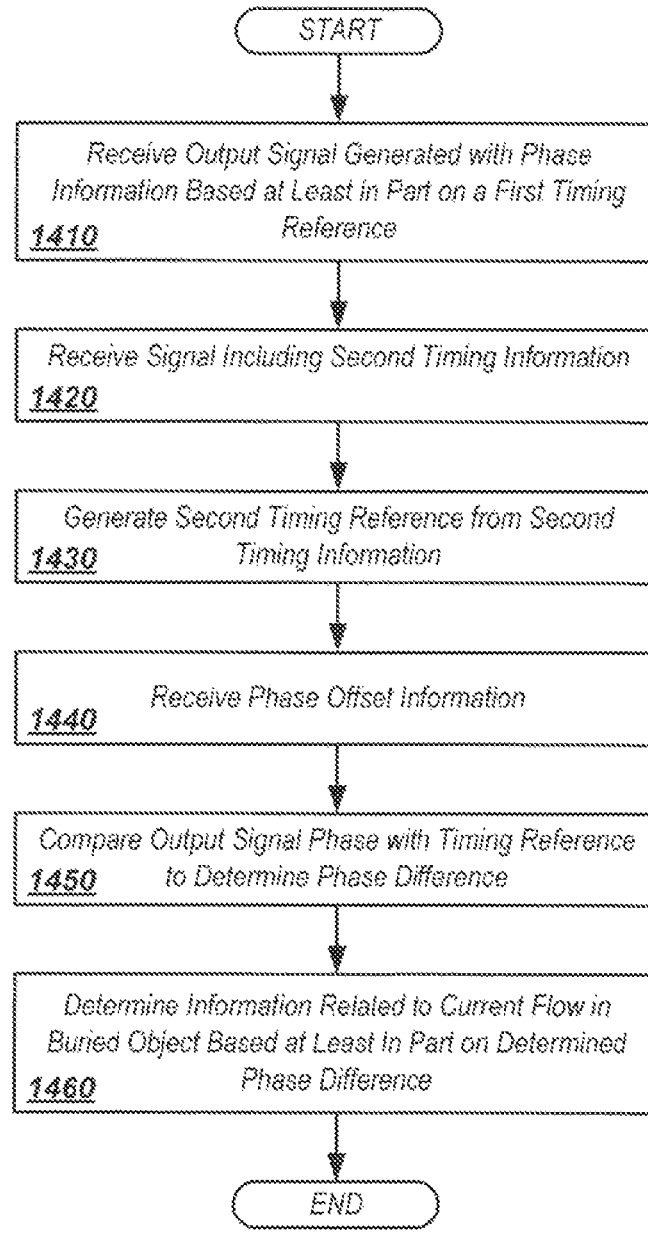
FIG. 14 illustrates details of an embodiment of a process for receiving and processing phase-synchronized signals in a buried object locator.

FIG. 14 illustrates details of embodiment of a process 1400 showing another process for receiving and processing a received phase-synchronized signal to determine information associated with current flow. Process 1400 may be implemented similarly to process 1300 with the addition of receiving phase offset information at stage 1440. Process 1400 may begin at stage 1410, where a signal may be received in a locator. The signal may be based on a magnetic field signal received at the locator from a phase-synchronized current flow in a buried object, generated by a corresponding transmitter, such as transmitter 160. The signal may be phase-synchronized at the transmitter based on timing information received at the transmitter from a first timing signal, such as a GPS signal. The phase-synchronized signal may be processed, such as to filter noise and/or otherwise adjust the received signal at the receiver.

At stage 1420, a signal including second timing information may be received at the locator, such as from a GPS or terrestrial communication. At stage 1430, a second timing reference signal may be generated at the locator based on the received second timing information. At stage 1440, phase offset information may be received at the locator, such as via a wired or wireless connection such as an ISM radio connection or serial wired connection. At stage 1450, the phase of the phase-synchronized output signal and the second timing reference signal may be compared. This comparison may be used to determine a relative phase offset or difference between the signal sent from the transmitter, based on the first timing information, and a second, independently generated timing reference signal generated at the locator based on the second timing information. By doing such a comparison, phase shifts, such as illustrated in FIGS. 2A-2C, may be determined, thereby providing information regarding an indicated direction of current flow in the buried object, and/or the orientation of the locator relative to the buried object at stage 1460.

FIG. 15 illustrates details of one embodiment of a buried object transmitter 1500, which may correspond with transmitter 160. Transmitter 1500 may include a user interface module 1530, which may be configured to receive user input information, such as information on transmitter configuration, output power, frequency settings, coupling configuration, and/or other user provided information. User interface module 1530 may provide user information or control signaling 1533 to output module 1560 for generating phase-synchronized output 1563.

Transmitter 1500 may include a timing synchronization module 1510 configured to receive a signal including timing information and generate a timing reference signal, which may be used to control output phase of a current signal so as to generate a phase-synchronized output signal as described previously herein. For example, a timing reference module 1514 may receive timing information 1513, such as a 1 PPS timing signal or other timing signal, provided from a timing receiver module 1512. Timing receiver module 1512 may be a GPS or other wired or wireless receiver module and may be coupled to an antenna 1562 or other wired or wireless connection (not shown) to receive a signal including timing information. Timing reference module 1514 may generate an analog or digital timing reference signal 1515 to be used as a reference to control output phase from the transmitter.

A phase-synchronized output module 1560 may be included to receive information from other modules, such as shown in FIG. 15, and generate a phase-synchronized output signal 1563. In the transmitter embodiment 1500, a feedback control loop module 1580 and feedback signal 1583 may be included to adjust the output signal to compensate for phase shifts due to coupling and/or other phase offsets. Output sensors 1570 may include voltage and/or current sensors to provide information 1573 to control module 1580 for use in adjusting the output and/or for other signal measurement or processing functions.

One or more processor modules 1540 along with one or more memories 1550 may be included in transmitter 1500 to control transmitter operations, store data and processor instructions, and/or perform the various transmitter processing functions described herein. In various embodiments these modules may be combined, in whole or part, to implement similar or equivalent functionality.

FIG. 16 illustrates details of one embodiment of a buried object transmitter 1600, which may correspond with transmitter 160 and may be configured similarly to transmitter 1500, while further including a phase offset transmitter module 1680 to measure a phase offset at the output of the transmitter, such as a phase offset caused by coupling impedance, and send the phase offset information to a corresponding locator. Transmitter embodiment 1600 may be configured the same or similarly to transmitter embodiment 1500 of FIG. 15.

Transmitter 1600 may include a user interface module 1630, which may be configured to receive user input information, such as information on transmitter configuration, output power, frequency settings, coupling configuration, and/or other user provided information. Transmitter 1600 may include a timing synchronization module 1610 configured to receive a signal including timing information and generate a timing reference signal, which may be used to control output phase of a current signal so as to generate a phase-synchronized output signal as described previously herein. User interface module 1630 may provide user information or control signaling 1633 to output module 1660 for generating phase-synchronized output 1663.

Transmitter 1600 may include a timing synchronization module 1610 configured to receive a signal including timing information and generate a timing reference signal, which may be used to control output phase of a current signal so as to generate a phase-synchronized output signal as described previously herein. For example, a timing reference module 1614 may receive timing information 1613, such as a 1 PPS timing signal or other timing signal, provided from a timing receiver module 1612. Timing receiver module 1612 may be a GPS or other wired or wireless receiver module and may be coupled to an antenna 1662 or other wired or wireless connection (not shown) to receive a signal including timing information. Timing reference module 1614 may generate an analog or digital timing reference signal 1615 to be used as a reference to control output phase from the transmitter.

A phase-synchronized output module 1660 may be included to receive information from other modules, such as shown in FIG. 16, and generate a phase-synchronized output signal. In the transmitter embodiment 1600, a sensor module 1670 may be included to sense any phase offset in the output current and provide information regarding the phase offset to phase offset transmitter module 1680. Output sensors 1670 may include voltage and/or current sensors to provide information for use in adjusting the output and/or for other signal measurement or processing functions as described herein. Output sensor information 1673 may be provided to a transmitter module 1680. Transmitter module 1680 may then send phase offset information 1683 and/or other information to a corresponding buried object locator, such as locator 120 of FIG. 1. The information may be sent via a wired or wireless connection. For example, an ISM band wireless connection may be used, or a serial data wired connection or other connection may also be used.

One or more processor modules 1640 along with one or more memories 1650 may be included in transmitter 1600 to control transmitter operations, store data and processor instructions, and/or perform the various transmitter processing functions described herein. In various embodiments these modules may be combined, in whole or part, to implement similar or equivalent functionality.

Figure 17:
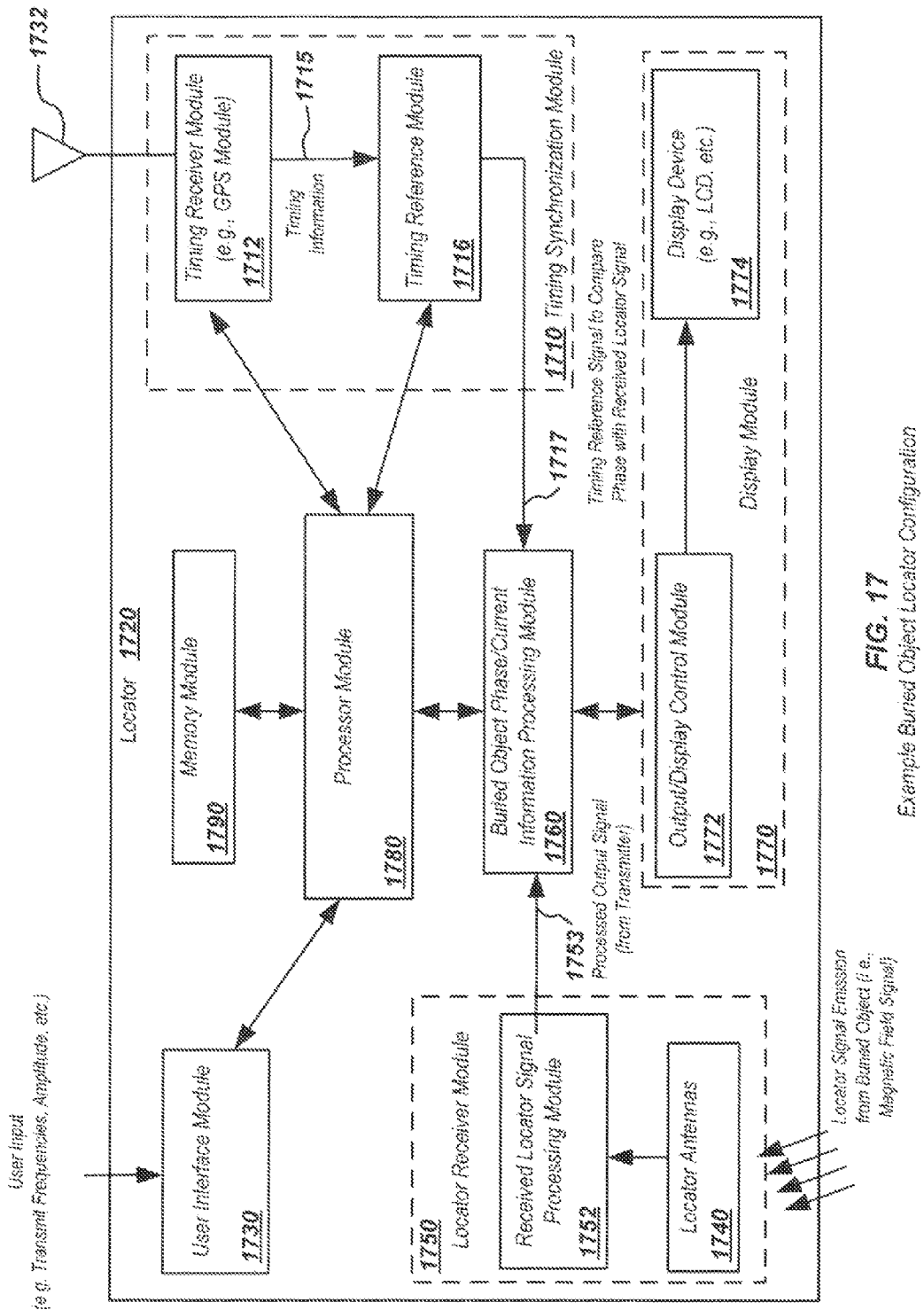
FIG. 17 illustrates details of an embodiment of an apparatus for use in a buried object locator to receive and process a phase-synchronized signal.

FIG. 17 illustrates details of an embodiment of a buried object locator 1720, which may be used in conjunction with a transmitter such as transmitter embodiment 1500 to locate buried objects and provide associated information through use of phase-synchronized output signals. Buried object locator 1720 may correspond with locator 120 of FIG. 1.

Locator 1720 may include a user interface module 1730, which may be configured to receive user input information, such as information on locator configuration, frequency settings, and/or other user provided information. Locator 1720 may include a timing synchronization module 1710 configured to receive a signal including timing information and generate a timing reference signal, which may be used to determine a phase offset or difference in a received signal, such as a magnetic field signal associated with current in a buried object generated by a corresponding transmitter, such as transmitter 1500. Timing module 1710 may include a timing receiver module 1712, such as a GPS, cellular, or other wired or wireless receiver module, and a timing reference module 1716 for generating a timing reference from timing information 1715 provided from the timing receiver module 1712. Timing information 1715 may be a standardized signal such as a 1 PPS signal. An antenna 1732 or other wired or wireless connection (not shown) may be used to couple incoming signals with timing information to module 1712. An output 1717, such as an analog or digital timing reference signal generated to be used to compare phase information with a signal 1753 provided from the locator receiver module, may be provided from timing reference module 1716.

A phase phase/current processing module 1760 may be included to receive information from other modules, such as shown in FIG. 17, including a processed output signal from a buried object current, as received by a locator antenna, and generate phase offset or difference information, as well as information related to the current flow in the buried object, such as current direction relative to the locator orientation. Locator receiver module 1750 may be configured with one or more locator antennas 1740, which may correspond with antennas 140 as shown in FIG. 1, as well as associated signal processing circuitry 1752, which may be used to filter and/or otherwise process the received locator signals to generate an output signal 1753 corresponding to the current in the buried object. For example, signal processing circuitry 1752 may further include a processing module for adjusting for additional phase shifts in the received signal, such as a 90 degree phase shift as shown in FIG. 24 due to inductive locator sensing (which may alternately be done in other modules of the locator, such as module 1760). Module 1760 may process the output signal and timing reference signal to generate phase difference information and/or information associated with the buried object current and provide this information to a display module 1770, where it may be further processed in module 1772 for rendering on a display device 1774, such as an LCD or other display device. The current information may be displayed on a graphic user interface (GUI) of the display device, and/or may be otherwise output, such as in the form of vibrational outputs, audio signals, and/or in the form of other sensory outputs.

One or more processing modules 1780 along with one or more memories 1790 may be included in locator 1720 to control locator operations, store data and processor instructions, and/or perform the various locator processing functions described herein. In various embodiments these modules may be combined, in whole or part, to implement similar or equivalent functionality.

Figure 18:
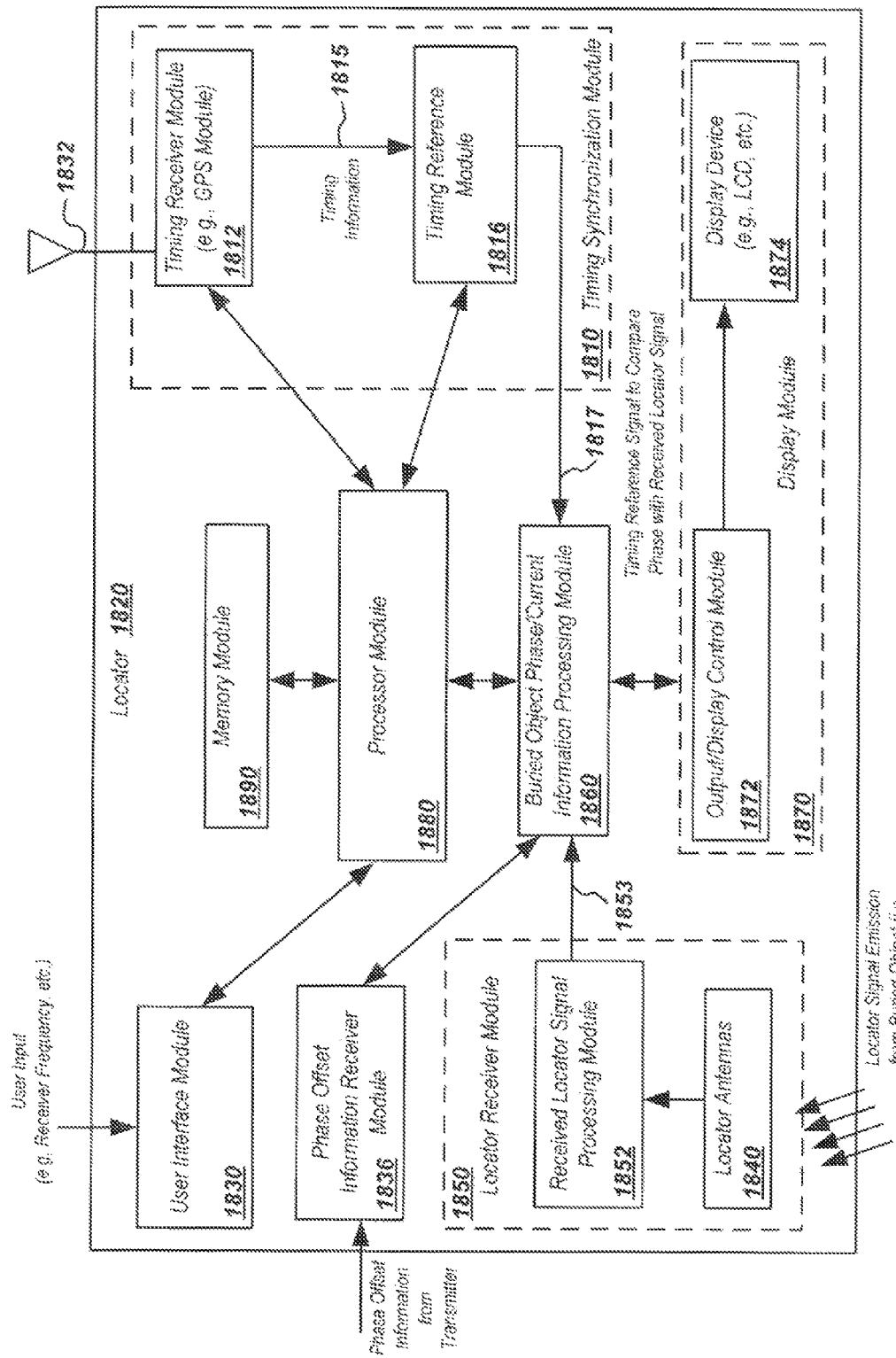
FIG. 18 illustrates details of an embodiment of an apparatus for use in a buried object locator to receive and process a phase-synchronized signal and phase offset information.

FIG. 18 illustrates details of another embodiment of a buried object locator 1820, which may be used in conjunction with a transmitter such as transmitter 1600 to locate buried objects and provide associated information. Buried object locator 1820 may correspond with locator 120 of FIG. 1. Locator embodiment 1820 may be implemented similarly to embodiment 1720 and modules may be the same or similar. Locator 1820 may include a user interface module 1830, which may be configured to receive user input information, such as information on locator configuration, frequency settings, and/or other user provided information through use of phase-synchronized output signals.

Locator 1820 may include a timing synchronization module 1810 configured to receive a signal including timing information and generate a timing reference signal, which may be used to determine a phase offset or difference in a received signal, such as a magnetic field signal associated with current in a buried object generated by a corresponding transmitter, such as transmitter 1600. A phase/current processing module 1860 may be included to receive information from other modules, such as shown in FIG. 18, including a processed output signal from a buried object current, as received by a locator antenna, as well as phase offset information, which may be received at phase offset receiver module 1836 and provided to module 1860, and generate phase offset or difference information, as well as information related to the current flow in the buried object, such as indicated current direction relative to the locator orientation.

Locator receiver module 1850 may be configured with one or more locator antennas 1840, which may correspond with antennas 140 as shown in FIG. 1, as well as associated signal processing circuitry 1852, which may be used to filter and/or otherwise process the received locator signals to generate an output signal 1853 corresponding to the current in the buried object. Module 1860 may process the output signal, timing reference signal 1817 from a timing reference module 1816, and phase offset information to generate phase difference information and/or information associated with the buried object current, and provide this information to a display module 1870, where it may be further processed in output/display control module 1872 for rendering on a display device 1874, such as an LCD or other display device. Timing information 1815 may be provided from a receiver module 1812, such as a GPS receiver module, cellular receiver module, or other wired or wireless receiver, which may be coupled to an antenna 1832 or wired connection (not shown). The timing information 1815 may be in the form of a standardized timing signal such as a 1 PPS signal or other timing signal. Timing reference signal 1717 may be a signal such as an analog or digital timing reference signal generated to be used to compare phase information with signal 1853 provided from the locator receiver module 1850.

The buried object current information may be displayed on a graphic user interface (GUI) of the display device, and/or may be otherwise output, such as in the form of vibrational outputs, audio signals, and/or in the form of other sensory outputs. Example display device outputs including arrows or moving or dashed lines, such as "moving ant" displays to graphically display indicated current direction and/or other information related to the buried object.

One or more processor modules 1880 along with one or more memories 1890 may be included in locator 1820 to control locator operations, store data and processor instructions, and/or perform the various locator processing functions described herein. In various embodiments these modules may be combined, in whole or part, to implement similar or equivalent functionality.

Figure 19:
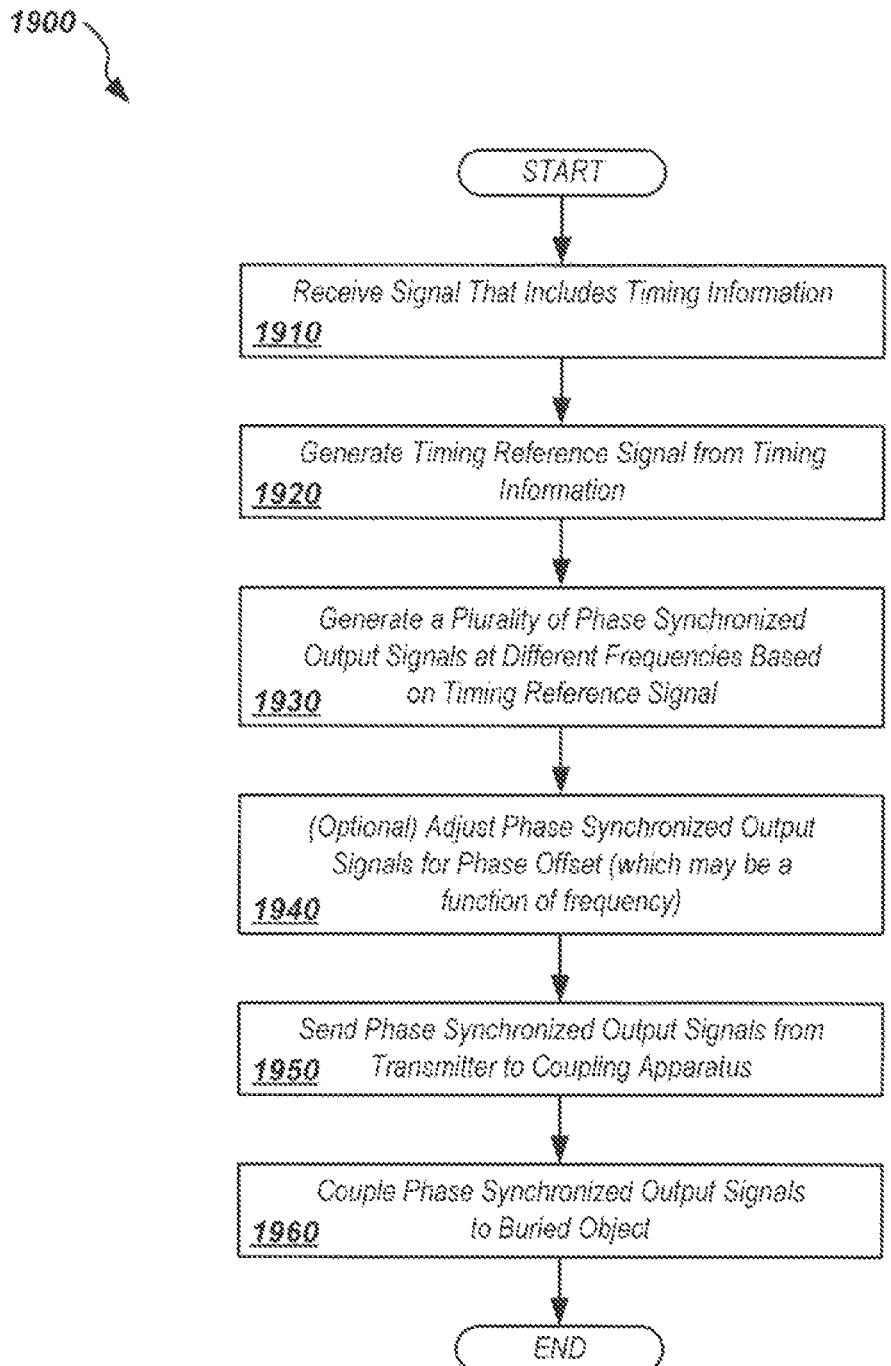
FIG. 19 illustrates details of an embodiment of a process for generating phase-synchronized output signals in a buried object transmitter.

In some embodiments, multiple phase-synchronized current output signals may be provided from a transmitter, such as transmitter 160, at different frequencies, and correspondingly processed at an associated locator. These multiple signals may be processed in the corresponding locator to determine additional information related to the buried object and associated buried object current flow, indicated flow direction, impedance, and/or other information. For example, FIG. 19 illustrates details of an embodiment of a process 1900, which may be similar to process 1100, for generating multiple output signals at a plurality of frequencies. As noted previously herein, these signals need not be self phase-synchronized but rather are phase-synchronized with respect to information at the associated locator so that each can be compared in the locator based on the phase-synchronization. Process 1900 may be implemented in a module in a buried object transmitter, such as transmitter 160.

At stage 1910 a signal that includes timing information may be received at the transmitter. The signal may be, for example, a GPS or terrestrial signal or other signal with timing information. The signal may be received in a timing received module, such as module 1512 as shown in FIG. 15. The timing information may be extracted and used to generate a timing reference signal at stage 1920. This may be done in various ways. In one embodiment, a timing output in the form of a periodic pulse signal, such as described in FIG. 10, may be generated. At stage 1930, a plurality of phase-synchronized output signals may be generated, based on the timing reference signal, such as illustrated in FIG. 10.

The phase-synchronized output signals may then optionally be adjusted at stage 1940, such as through a feedback circuit such as shown in FIG. 6, to adjust for phase offsets due to coupling impedance and/or other causes, which may be done separately at each output frequency. The phase-synchronized current output signals may then be provided from the transmitter at stage 1950 to a coupling apparatus, such as shown in FIGS. 2A-2C, to couple the output current to a buried object. At stage 1960, the current may be coupled to the buried object and will then flow in the buried object, where corresponding magnetic field emissions may be detected by a locator and processed to perform phase comparisons as described herein.

Figure 20:
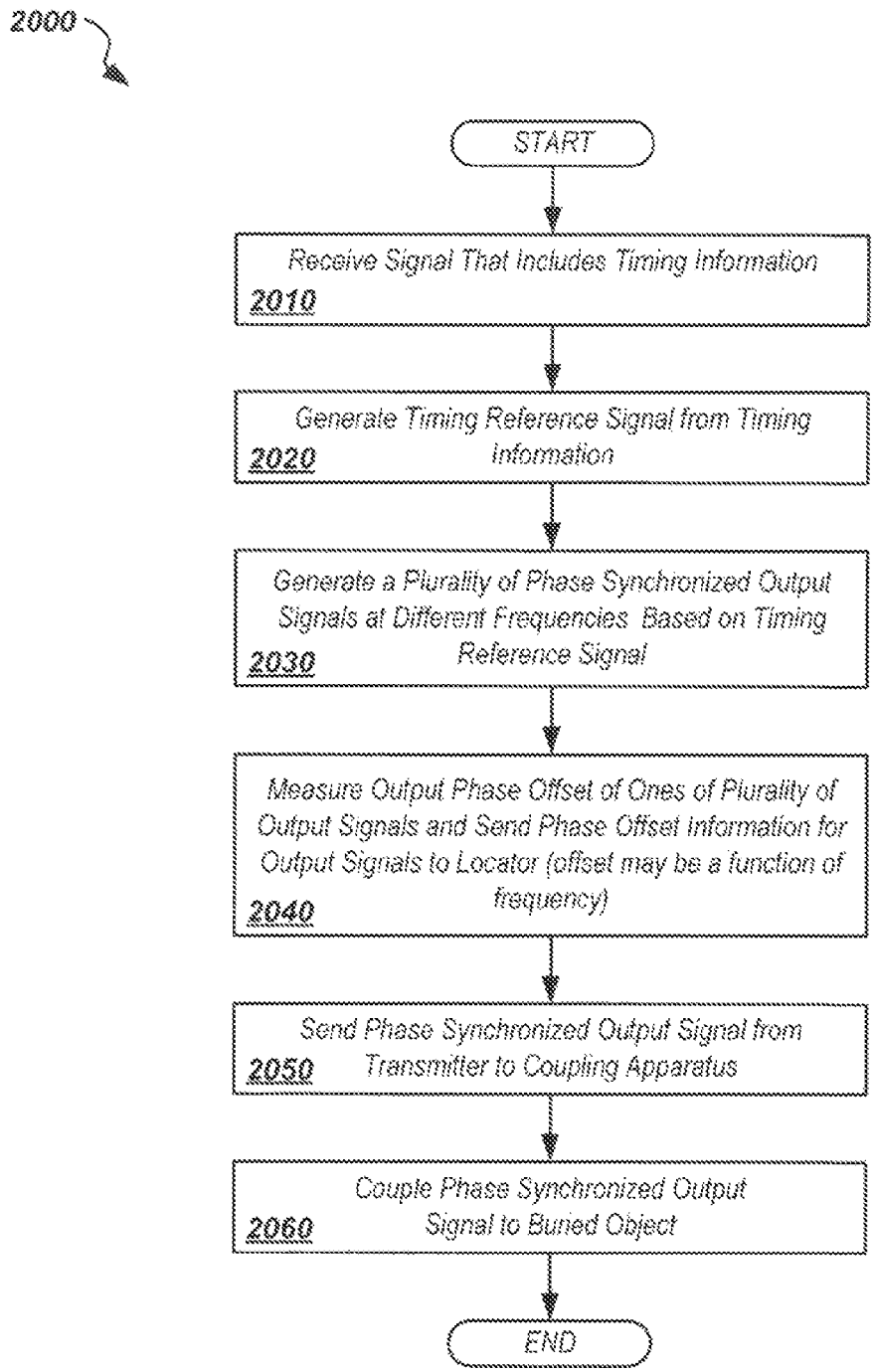
FIG. 20 illustrates details of an embodiment of a process for generating phase-synchronized output signals in a buried object transmitter and sending phase offset information.

FIG. 20 illustrates details of an embodiment of an alternate process 2000 for generating an output signal, such as in a circuit as shown in FIG. 7. Process 2000 may be implemented similarly to process 1900, except that a phase offset may be measured (rather than corrected for as shown in process 1900) at stage 2040, which may be done at each of a plurality of output frequencies. As noted previously herein, these signals need not be self phase-synchronized but rather are phase-synchronized with respect to information at the associated locator so that each can be compared in the locator based on the phase-synchronization. The phase offset information may then be sent to a corresponding locator, such as illustrated in FIG. 7. For example, at stage 2010 a signal including timing information, such as from a satellite or terrestrial transmission, may be received. The timing information may be extracted and used to generate a timing reference signal at stage 2020. This may be done in various ways. In one embodiment, a timing output in the form of a periodic pulse signal, such as described in FIG. 10, may be generated. At stage 2030, a plurality of phase-synchronized output signals may be generated, based on the timing reference signal, such as illustrated in FIG. 10.

The phase-synchronized output signals may then optionally be determined at stage 2040 and phase offset information sent to a corresponding locator, such as via a wired or wireless connection for use in comparing signals at the locator as described herein. The phase-synchronized output signals may then be provided from the transmitter at stage 2050 to a coupling apparatus, such as shown in FIGS. 2A-2C, to couple the output current to a buried object. At stage 2060, the output current signal may be coupled to the buried object and will then flow in the buried object, where corresponding magnetic field emissions may be detected by a locator as described herein.

Figure 21:
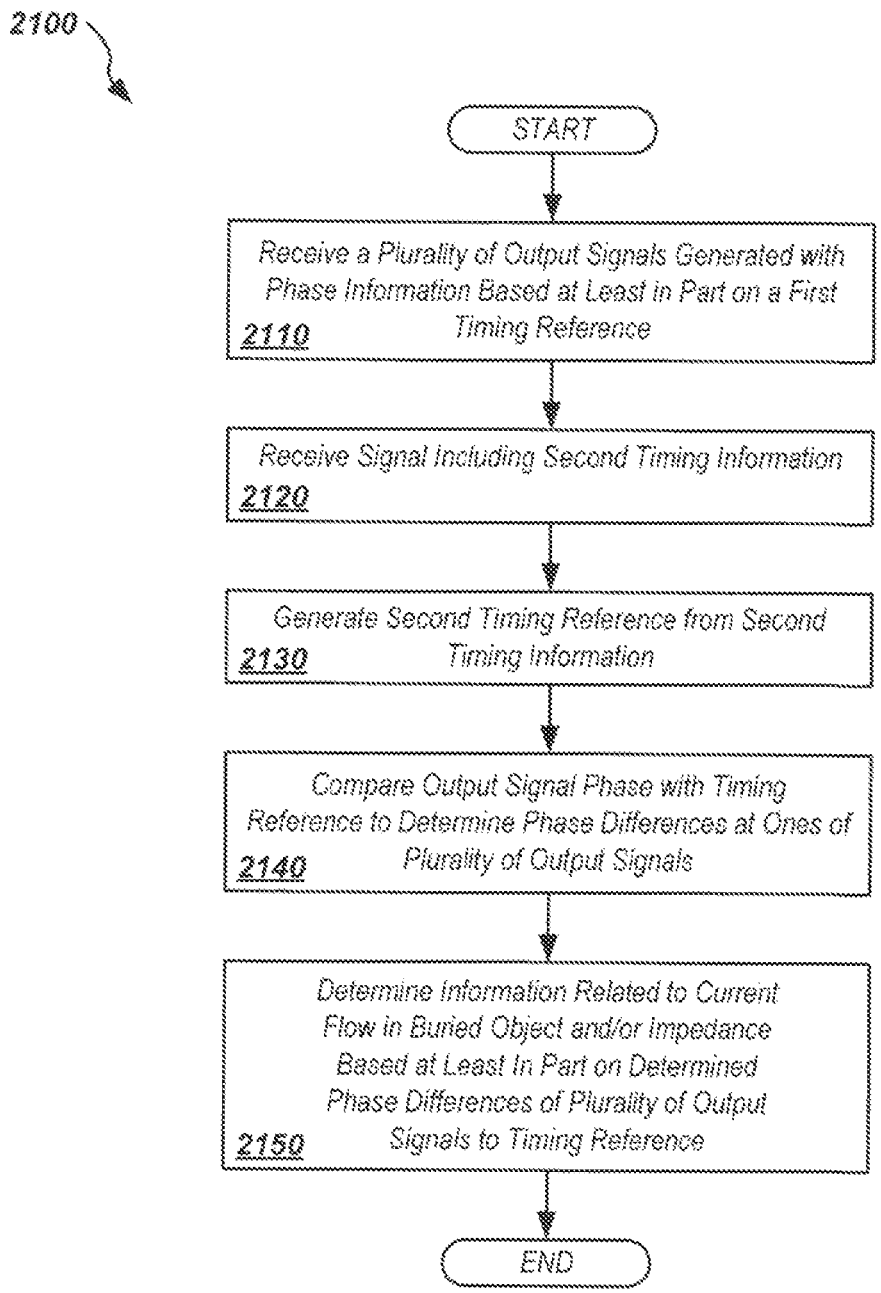
FIG. 21 illustrates details of an embodiment of a process for receiving and processing a plurality of phase-synchronized output signals in a buried object transmitter.

FIG. 21 illustrates details of an embodiment of a process 2100 for receiving and processing a plurality of phase-synchronized signals in a locator, such as locator 120, where the signals may be from a magnetic field signal emitted from a phase-synchronized current signal flowing in a buried object, such as provided from a transmitter as described herein.

At stage 2110 a plurality of output signals at different frequencies may be received in a locator. The signals may be based on a magnetic field signal received at the locator from a corresponding plurality of phase-synchronized output current signals flowing in a buried object, generated by a corresponding transmitter, such as transmitter 160. The plurality of signals may be phase-synchronized at the transmitter based on timing information received at the transmitter from a first timing signal, such as a GPS signal or terrestrial timing signal. The phase-synchronized signals may be processed in the locator, such as to filter noise and/or otherwise adjust the received signal.

At stage 2120, a second timing signal including second timing information may be received at the locator. At stage 2130, a plurality of second timing reference signals may be generated at the locator based on the received second timing information. At stage 2140, the phases of the plurality of phase-synchronized output signals and the plurality of second timing reference signals at different frequencies may be compared. This comparison may then be used to determine relative phase offsets or differences between the plurality of signals sent from the transmitter, based on the first timing information, and the plurality of second, independently generated timing reference signals generated at the locator based on the second timing information. Put another way, output signals at two or more frequencies may be compared with timing reference signals at the same frequencies to determine a plurality of phase offsets at the two or more frequencies. By doing such a series of comparisons, phase shifts, such as illustrated in FIGS. 2A-2C, may be determined for each frequency, thereby providing information regarding an indicated direction of current flow in the buried object, impedance, orientation of the locator relative to the buried object, and/or other information at stage 2150.

Figure 22:
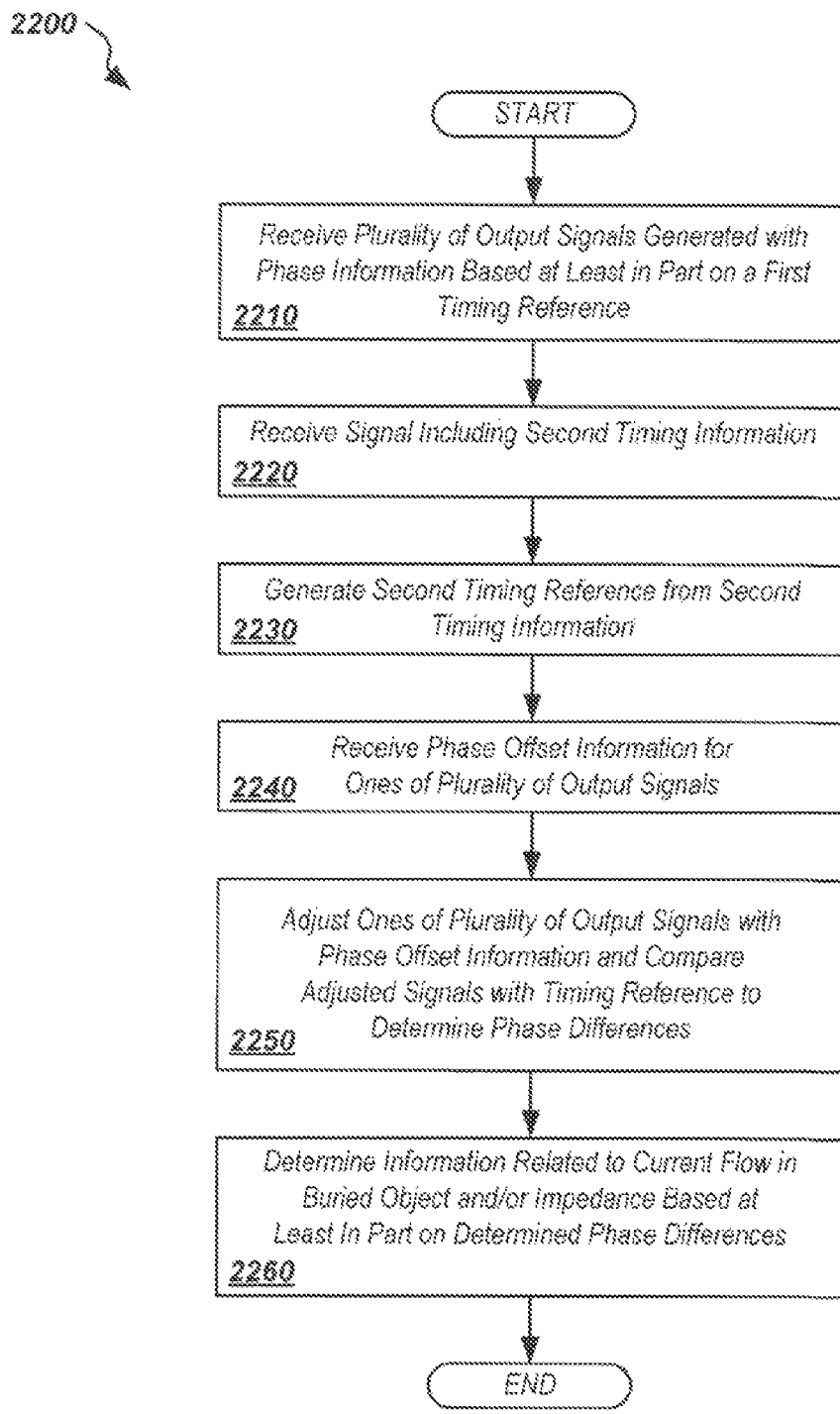
FIG. 22 illustrates details of an embodiment of a process for receiving and processing a plurality of phase-synchronized output signals in a buried object transmitter and corresponding phase offset information.

FIG. 22 illustrates details of another embodiment of a process 2200 for receiving and processing a plurality of received output signals to determine information associated with current flow and/or impedance. Process 2200 may be implemented similarly to process 2100 of FIG. 21, with additional received phase offset information. It is noted that the measured phase in this process as well as others described herein may change, sometimes substantially, as a function of distance along the buried utility due to anode connections, insulation defects, coating thickness variations, etc. The measured difference between corrected phase at the transmitter and the received phase at the locator may be used to indicate such variation in signal propagation conditions.

Returning to FIG. 22, process 2200 may begin at stage 2210, where a plurality of output signals at different frequencies may be received in a locator. The signals may be based on a magnetic field signal received at the locator from a corresponding plurality of phase-synchronized output current signals flowing in a buried object, generated by a corresponding transmitter, such as transmitter 160. The plurality of signals may be phase-synchronized at the transmitter based on timing information received at the transmitter from a first timing signal, such as a GPS signal. The phase-synchronized signals may be processed in the locator, such as to filter noise and/or otherwise adjust the received signal.

At stage 2220, a second timing signal including second timing information may be received at the locator. At stage 2230, a second timing reference signal may be generated at the locator based on the received second timing information. At stage 2240, phase information for ones of the plurality of output signals may be received at the locator. This information may be sent from the transmitter, such as via a wired or wireless connection to the locator. At stage 2250, the phases of the plurality of phase-synchronized output signals may be adjusted with phase offset information as provided at stage 2240, and the plurality of second timing reference signals at different frequencies may be compared to determine phase differences. Similarly to FIG. 21, information related to current flow and/or impedance may be determined based on the determined phase differences.

Figure 23:
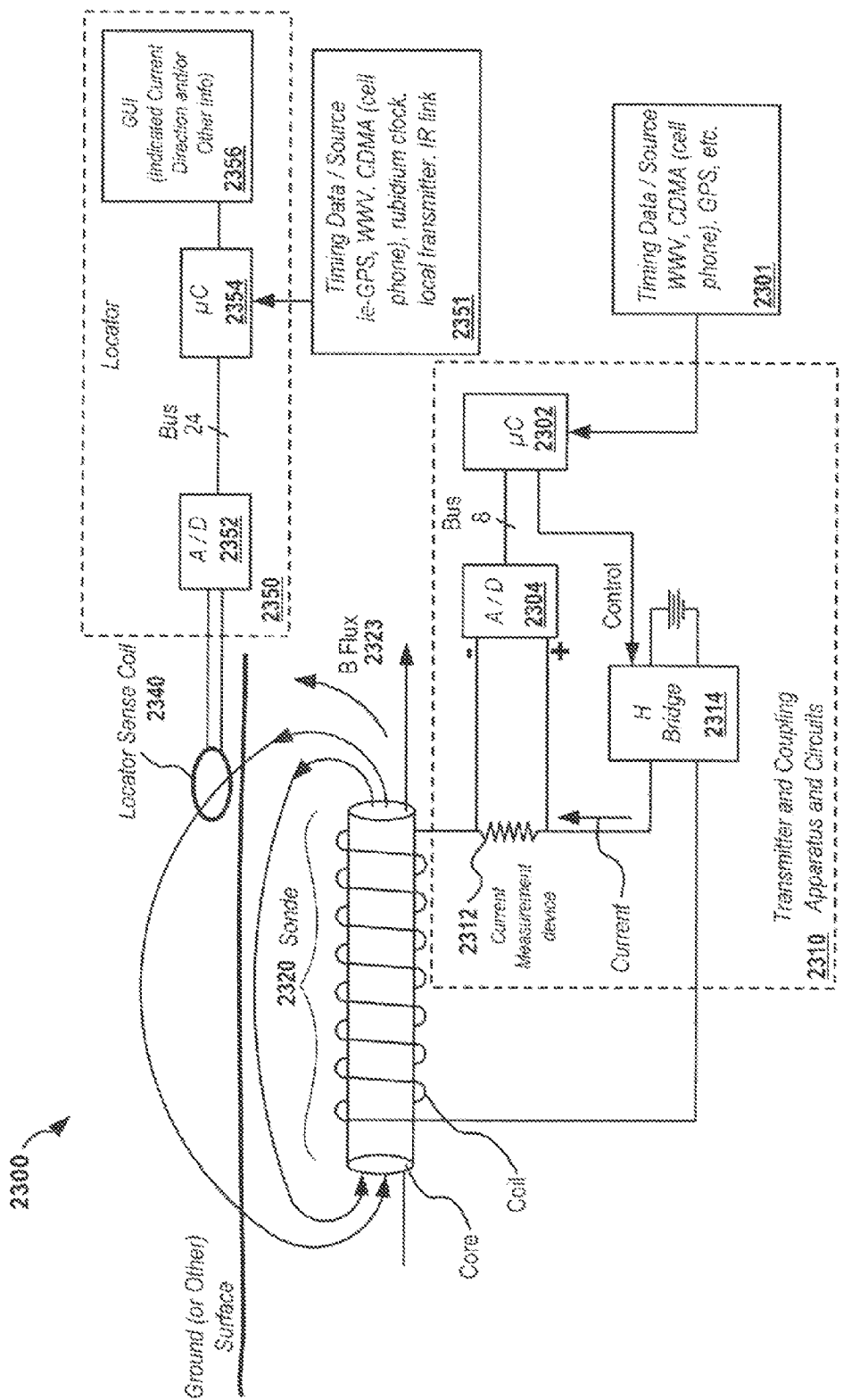
FIG. 23 illustrates details of a buried object locating system using a sonde.

In some embodiments, other mechanisms for generating magnetic field signals in a buried object may alternately be used, such as magnetic dipole field sondes. FIG. 23 illustrates details of one embodiment 2300 of such an alternate configuration, where a magnetic field signal generated by a sonde 2320 is phase-synchronized based on information from timing source 2301, such as described previously herein, with first timing information, while an associated locator 2350 is independently synchronized with second timing information from a timing source 2351. These timing sources may be the same type of timing sources, for example GPS systems, where separate receivers in the transmitter and locator receive timing information and generate timing synchronization signals, or may be shared or inter-coordinated timing sources such as described herein. For example, satellite or terrestrial (e.g., cellular or locally generated timing signal transmissions) may be used in various embodiments.

Returning to FIG. 23, a transmitter and associated coupling apparatus and circuits 2310, which may include one or more processing elements along with associated analog and/or digital electronics, electrical and/or mechanical coupling assemblies, and the like (not shown) receive timing information from timing source 2301. The timing information may be provided to a microcontroller 2302 or other processing element, which may also receive information on current phase and/or amplitude from a current sensor or measurement device 2312 configured to sample currents in conductors driving the sonde 2320. The microcontroller may then generate a control signal for controlling the relative phase of the current flow to the sonde, such as through an impedance (H) bridge 2314 as shown, so as to synchronize it relative to separate timing information generated at the locator 2350. An A/D or other circuit element may convert the current information to digital format for use by the microcontroller 2302 for use in controlling current phase.

Sonde 2320 generates a magnetic field (B Flux 2323), typically (but not necessarily) while positioned under the ground or other surfaces based on its driving current. A locator 2350 and associated locator antennas, such as one or more sense coils 2340, which may be multiple coils, multi-dimensional coil arrays or other antenna/sense configurations, may then generate an output signal to be provided to the locator for further processing. If the output signal is an analog signal, an Analog to Digital (A/D) converter module 2352 in locator 2350 may then convert the signal to a digital format and provide it to a processing element of the locator, such as microcontroller 2354 (or other processing elements).

Locator 2350 receives timing data 2351 which is provided to the processor 2354 for use in generating a timing synchronized reference signal to which the received signal may be compared in phase. Locator circuitry may generate other information such as position, depth, and the like based on the received magnetic field signal 2323.

Corresponding output information, such as indicated current flow direction information, current amplitude information, and/or other determined information associated with the sonde signals such as depth, position, etc. may be displayed on GUI 2356. This information may also be integrated with other information, such as position or location information, mapping data or information, time/date information, and/or other information and may be stored in a memory and/or transmitted to other devices or systems.

FIG. 24 illustrates details of additional phase shifts of 90 degrees that may be generated by inductive sensing at a locator. In this case, additional phase adjustment may be done in the locator processing (and/or at the transmitter if the locator phase shifts are compensated for at the transmitter, such as described previously herein with respect to coupling phase shift adjustments), such as in a processing element of the locator and/or in associated electronic components and control circuits.

In some configurations, the apparatus, circuit, devices, modules, or systems described herein may include means for implementing features or providing functions described herein. In one aspect, the aforementioned means may be a module including a processor or processors, associated memory and/or other electronics in which embodiments of the invention reside, such as to implement signal processing, switching, transmission, or other functions to process and/or condition transmitter outputs, locator inputs, and/or provide other electronic functions described herein. These may be, for example, modules or apparatus residing in buried object transmitters, locators, coupling apparatus, and/or other related equipment or devices.

In one or more exemplary embodiments, the electronic and signal processing functions, methods and processes described herein and associated with transmitters and locators may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EE-PROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, computer program products comprising computer-readable media include all forms of computer-readable medium except, to the extent that such media is deemed to be non-statutory, transitory propagating signals.

It is understood that the specific order or hierarchy of steps or stages in the processes and methods disclosed herein are examples of exemplary approaches. Based upon design preferences, it is understood that the specific order or hierarchy of steps in the processes may be rearranged while remaining within the scope of the present disclosure unless noted otherwise.

Those of skill in the art would understand that information and signals, such as video and/or audio signals or data, control signals, or other signals or data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, electro-mechanical components, or combinations thereof. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative functions and circuits described in connection with the embodiments disclosed herein with respect to transmitters and locators or similar devices may be implemented or performed in one or more processing elements with a general purpose processor, special purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A processing element may include one or more memory devices coupled to the processors or other logic devices, along with associated analog or digital electronic elements, A/D or D/A converters, interface circuits, or other peripheral devices or circuits.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The disclosure is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the presently claimed invention. Various modifications to these aspects will be readily apparent to those skilled in the art, and the generic principles defined herein may be applied to other aspects without departing from the spirit or scope of the disclosure. Thus, the presently claimed invention is not intended to be limited to the aspects and details shown herein but is to be accorded the widest scope consistent with the appended claims and their equivalents.

We claim:

1. A method for use in a buried object locator system, comprising:

receiving a transmitted signal, including timing information, at a buried object locator system transmitter;

generating a timing reference from the timing information at the buried object locator system transmitter;

generating a phase-synchronized output signal having a phase determined at least in part by the timing reference at the buried object locator system transmitter;

sending the output signal from the buried object locator system transmitter to a coupling device to generate a buried object current;

receiving a magnetic field signal associated with the buried object current at a buried object locator;

determining information about the buried object current based at least in part on the phase of the magnetic field signal; and independently determining a second timing reference at the locator system, wherein the information about the buried object current is based in part on the second timing reference.

2. The method of claim 1, wherein the transmitted signal is a Global Positioning Satellite (GPS) system signal.

3. The method of claim 1, wherein the transmitted signal is a terrestrially generated signal.

4. The method of claim 1, wherein the information about the buried object current includes information about an indicated direction of flow of the buried object current relative to an orientation of the locator.

5. The method of claim 4, further comprising providing a graphical display of the indicated direction of flow of the buried object current on a GUI display of the locator.

6. The method of claim 1, wherein the determining a second timing reference comprises:

receiving a second transmitted signal including second timing information; and determining the second timing reference based on the second timing information.

7. The method of claim 6, wherein the second transmitted signal is a Global Positioning Satellite (GPS) system signal.

8. The method of claim 6, wherein the second transmitted signal is a terrestrially generated signal.

9. A method for use in a buried utility locator system, comprising:

receiving a magnetic field signal associated with a current in a buried object, wherein the magnetic field signal is generated with a phase based at least in part on a first timing reference determined from a first transmitted signal including first timing information;

receiving a second transmitted signal including second timing information;

determining a second timing reference from the second timing information; and determining information related to the current in the buried object based on the received magnetic signal and second timing reference.

10. The method of claim 9, wherein the information related to a current relates to a phase of the current.

11. The method of claim 9, wherein the information related to a current relates to an indicated direction of current flow.

12. The method of claim 9, wherein the first and second transmitted signals are Global Positioning Satellite (GPS) system signals.

13. The method of claim 9, wherein the first and second transmitted signals are cellular system signals.

14. The method of claim 9, wherein the output signal is coupled to a buried object.

15. The method of claim 9, further comprising providing a display of an indicated direction of current flow in the buried object.

16. The method of claim 9, wherein the magnetic field signal is synchronously detected based on the received timing information.

17. A locator for use in a buried utility locator system, comprising:

a locator receiver module for receiving a magnetic field signal from a buried object associated with a current in the buried object, wherein the magnetic field signal is generated with a phase based at least in part on a first timing reference determined from a first transmitted signal including first timing information;

a timing synchronization module including a receiver module configured to receive a second transmitted signal that includes second timing information and determine a second timing reference from the second timing information; and a processing module configured to determine information related to the current in the buried object based on the received magnetic signal and the second timing reference.

18. The locator of claim 17, further comprising a display module configured to display the information related to a current.

19. The locator of claim 18, wherein the information related to the current includes current phase.

20. The locator of claim 19, wherein the information related to a the current includes an indicated direction of current flow in the buried object.

21. The locator of claim 17, wherein the locator is configured to synchronously detect the magnetic field signal emission based at least in part on the second timing information.

22. A system including a first non-transitory computer readable medium including instructions for causing a computer to:

receive a first transmitted signal that includes timing information;

determine a timing reference from the timing information;

generate an output signal having a phase determined at least in part by the timing reference; and send the output signal to a coupling apparatus; and a second non-transitory computer readable medium including instructions for causing a computer to:

receive a magnetic signal associated with a current in a buried object, wherein the magnetic signal is generated with a phase based at least in part on a first timing reference determined from a first transmitted signal including first timing information;

receive a second transmitted signal including second timing information;

determine a second timing reference from the second timing information; and determine an indicated current direction in a buried object based on the received locator signal and the second timing reference.

\* \* \* \* \*